United States Patent
Seta et al.

(10) Patent No.: US 12,304,089 B2
(45) Date of Patent: May 20, 2025

(54) DATA PROCESSING DEVICE, DATA PROCESSING METHOD, AND ROBOT

(71) Applicant: SONY GROUP CORPORATION, Tokyo (JP)

(72) Inventors: Kenichi Seta, Tokyo (JP); Norifumi Goto, Tokyo (JP); Masahiro Otsuka, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 362 days.

(21) Appl. No.: 17/636,253

(22) PCT Filed: Sep. 23, 2020

(86) PCT No.: PCT/JP2020/035754
§ 371 (c)(1),
(2) Date: Feb. 17, 2022

(87) PCT Pub. No.: WO2021/065610
PCT Pub. Date: Apr. 8, 2021

(65) Prior Publication Data
US 2022/0288790 A1    Sep. 15, 2022

(30) Foreign Application Priority Data

Oct. 3, 2019  (JP) ................ 2019-183085

(51) Int. Cl.
*B25J 9/16*    (2006.01)
*B25J 13/00*   (2006.01)
(Continued)

(52) U.S. Cl.
CPC ............. *B25J 9/1697* (2013.01); *B25J 13/00* (2013.01); *G06F 18/285* (2023.01); *G06V 40/10* (2022.01); *G06F 8/65* (2013.01); *G06V 20/58* (2022.01)

(58) Field of Classification Search
CPC ....... B25J 9/1697; B25J 13/00; G06F 18/285; G06F 8/65; G06F 13/00; G06V 40/10;
(Continued)

(56) References Cited

U.S. PATENT DOCUMENTS 8,918,208 B1 * 12/2014 Hickman ............... B25J 9/1602
                                                   700/1
8,965,104 B1    2/2015 Hickman
(Continued)

FOREIGN PATENT DOCUMENTS

CN      110281248 A    9/2019
JP      2002-504724 A  2/2002
(Continued)

*Primary Examiner* — Sohana Tanju Khayer
(74) *Attorney, Agent, or Firm* — Paratus Law Group, PLLC

(57) ABSTRACT

There is provided a data processing device, a data processing method, and a robot capable of performing human sensing using an appropriate algorithm. The data processing device according to one aspect of the present technology adaptively selects to execute a human sensing program in which a human sensing algorithm to sense a human on the basis of sensor data output from a sensor mounted on a robot is defined according to a human sensing condition. The present technology may be applied to a sensor device mounted on various devices.

20 Claims, 30 Drawing Sheets

(51) Int. Cl.
  *G06F 18/20* (2023.01)
  *G06V 40/10* (2022.01)
  *G06F 8/65* (2018.01)
  *G06V 20/58* (2022.01)

(58) Field of Classification Search
  CPC ........ G06V 20/58; G06V 10/95; G06V 10/96; G06V 40/172
  See application file for complete search history.

(56) References Cited

U.S. PATENT DOCUMENTS

| | | | | |
|---|---|---|---|---|
| 10,898,999 | B1* | 1/2021 | Cohen | B25J 9/0003 |
| 2005/0147292 | A1* | 7/2005 | Huang | G06F 18/254 |
| | | | | 382/218 |
| 2005/0152582 | A1* | 7/2005 | Yoon | G06V 40/162 |
| | | | | 382/190 |
| 2006/0276934 | A1* | 12/2006 | Nihei | B25J 9/1679 |
| | | | | 700/245 |
| 2012/0232697 | A1 | 9/2012 | Lee | |
| 2013/0342652 | A1* | 12/2013 | Kikkeri | B25J 9/104 |
| | | | | 348/46 |
| 2015/0199917 | A1* | 7/2015 | French | G09B 19/0038 |
| | | | | 434/247 |
| 2015/0331416 | A1* | 11/2015 | Feniello | B25J 9/1661 |
| | | | | 700/250 |
| 2016/0148016 | A1* | 5/2016 | Rylski | G08B 13/19686 |
| | | | | 348/143 |
| 2016/0180195 | A1* | 6/2016 | Martinson | G06V 10/764 |
| | | | | 382/103 |
| 2016/0199977 | A1* | 7/2016 | Breazeal | B25J 11/0015 |
| | | | | 700/246 |
| 2017/0323167 | A1* | 11/2017 | Mapen | G06T 7/90 |
| 2018/0018520 | A1* | 1/2018 | Sumiyoshi | B25J 9/1697 |
| 2018/0104816 | A1* | 4/2018 | Tokuchi | B25J 9/1679 |
| 2018/0181813 | A1* | 6/2018 | Sun | G06V 40/172 |
| 2018/0217804 | A1* | 8/2018 | Manohar | G06V 20/20 |
| 2019/0287382 | A1* | 9/2019 | Siembab | G08B 13/19613 |
| 2019/0303684 | A1* | 10/2019 | Khadloya | G07C 9/00896 |
| 2019/0380662 | A1* | 12/2019 | Kwan | G16H 20/13 |
| 2019/0384389 | A1* | 12/2019 | Kim | G06F 3/017 |
| 2020/0016753 | A1* | 1/2020 | Shin | B25J 9/0018 |
| 2020/0089252 | A1* | 3/2020 | Kim | G01S 17/86 |
| 2020/0196913 | A1* | 6/2020 | Franz | A61B 5/1128 |
| 2020/0200393 | A1* | 6/2020 | Goldberg | F24C 7/088 |
| 2020/0406459 | A1* | 12/2020 | Park | G06V 40/16 |
| 2021/0001480 | A1* | 1/2021 | Artes | B25J 9/161 |
| 2021/0001810 | A1* | 1/2021 | Rivard | G06V 40/172 |
| 2021/0011484 | A1* | 1/2021 | Park | G05D 1/0214 |
| 2021/0046655 | A1* | 2/2021 | Deyle | B25J 9/1664 |
| 2021/0331318 | A1* | 10/2021 | Hwang | B25J 9/1653 |
| 2021/0331706 | A1* | 10/2021 | Kim | B60W 60/0027 |
| 2022/0005332 | A1* | 1/2022 | Metzler | G06F 18/2431 |
| 2022/0016757 | A1* | 1/2022 | Noma | G05D 1/0274 |
| 2022/0050473 | A1* | 2/2022 | Pärnpuu | G05D 1/0248 |
| 2022/0203540 | A1* | 6/2022 | Bank | B25J 9/1676 |
| 2022/0288790 | A1* | 9/2022 | Seta | G06F 13/00 |

FOREIGN PATENT DOCUMENTS

| | | |
|---|---|---|
| JP | 2007-286850 A | 11/2007 |
| JP | 2008-068342 A | 3/2008 |
| JP | 2011-198021 A | 10/2011 |
| WO | WO 2018/112495 A2 | 6/2018 |

* cited by examiner

DATA PROCESSING DEVICE, DATA PROCESSING METHOD, AND ROBOT

CROSS REFERENCE TO PRIOR APPLICATION

This application is a National Stage Patent Application of PCT International Patent Application No. PCT/JP2020/035754 (filed on Sep. 23, 2020) under 35 U.S.C. § 371, which claims priority to Japanese Patent Application No. 2019-183085 (filed on Oct. 3, 2019), which are all hereby incorporated by reference in their entirety.

TECHNICAL FIELD

The present technology especially relates to a data processing device, a data processing method, and a robot capable of performing human sensing using an appropriate algorithm.

BACKGROUND ART

Conventionally, various technologies for updating software of a device have been suggested from the viewpoint of adding a function and securing compatibility with other devices.

For example, Patent Document 1 discloses a technology of determining a service that may be implemented by a combination of a camera and a communication device, and installing software that provides the service.

Furthermore, Patent Document 2 discloses a technology of updating firmware between an imaging device and a host system in a case where it is detected that the firmware on the imaging device is incompatible with the host system.

CITATION LIST

Patent Document

Patent Document 1: Japanese Patent Application Laid-Open No. 2007-286850
Patent Document 2: Japanese Unexamined Patent Publication No. 2002-504724

SUMMARY OF THE INVENTION

Problems to be Solved by the Invention

Although various technologies for changing software of an imaging device such as a camera are disclosed, it is not disclosed to adaptively change software of a device that performs sensing according to a situation of a sensing target and the like.

The present technology is achieved in view of such a situation, and an object thereof is to perform human sensing using an appropriate algorithm.

Solutions to Problems

A data processing device according to a first aspect of the present technology is provided with a sensing control unit configured to adaptively select to execute a human sensing program in which a human sensing algorithm to sense a human on the basis of sensor data output from a sensor mounted on a robot is defined according to a human sensing condition.

A data processing device according to a second aspect of the present technology is provided with a data processing unit configured to adaptively select a human sensing program in which a human sensing algorithm to sense a human on the basis of sensor data output from a sensor mounted on a robot is defined according to a human sensing condition, and transmit to the robot.

A robot according to a third aspect of the present technology is provided with a sensor configured to output sensor data indicating a sensing result, a sensing control unit configured to adaptively select to execute a human sensing program in which a human sensing algorithm to sense a human on the basis of the sensor data output from the sensor is defined according to a human sensing condition, an operation plan setting unit configured to set an operation plan on the basis of an execution result of the human sensing program by the sensing control unit, and an operation unit configured to perform an operation according to the operation plan set by the operation plan setting unit.

In the first aspect of the present technology, the human sensing program in which the human sensing algorithm to sense the human on the basis of the sensor data output from the sensor mounted on the robot is defined is adaptively selected to be executed according to the human sensing condition.

In the second aspect of the present technology, the human sensing program in which the human sensing algorithm to sense the human on the basis of the sensor data output from the sensor mounted on the robot is defined is adaptively selected according to the human sensing condition and transmitted to the robot.

In the third aspect of the present technology, the human sensing program in which the human sensing algorithm to sense the human on the basis of the sensor data output from the sensor that outputs the sensor data indicating the sensing result is defined is adaptively selected to be executed according to the human sensing condition, the operation plan is set on the basis of the execution result of the human sensing program, and the operation is performed according to the set operation plan.

MODE FOR CARRYING OUT THE INVENTION

Outline of Present Technology

The present technology focuses on a point that it is difficult to perform sensing using an optimal algorithm in a sensor device mounted on various devices such as a robot, a moving body, and a smartphone due to the following factors, and achieves a solution thereof.

Factors

There are many types of elemental technologies.

Maturity of elemental technologies vary.

There are many variations in cost.

There are many variations in applications.

System design and implementation are challenging.

There are many types of user requests.

There are many mounting restrictions such as processor power, power consumption, and circuit size.

There are many types of sensing targets.

Especially, the present technology enables a sensor device that performs human sensing to perform the sensing using an optimal algorithm as a sensing algorithm that is an algorithm regarding the sensing.

Hereinafter, a mode for carrying out the present technology is described. The description is given in the following order.

1. Program Providing System
2. Use Case of Sensing Program
3. Configuration and Operation of Conveyance Robot
4. Other Use Cases
5. Variation <Program Providing System>

Figure 1:
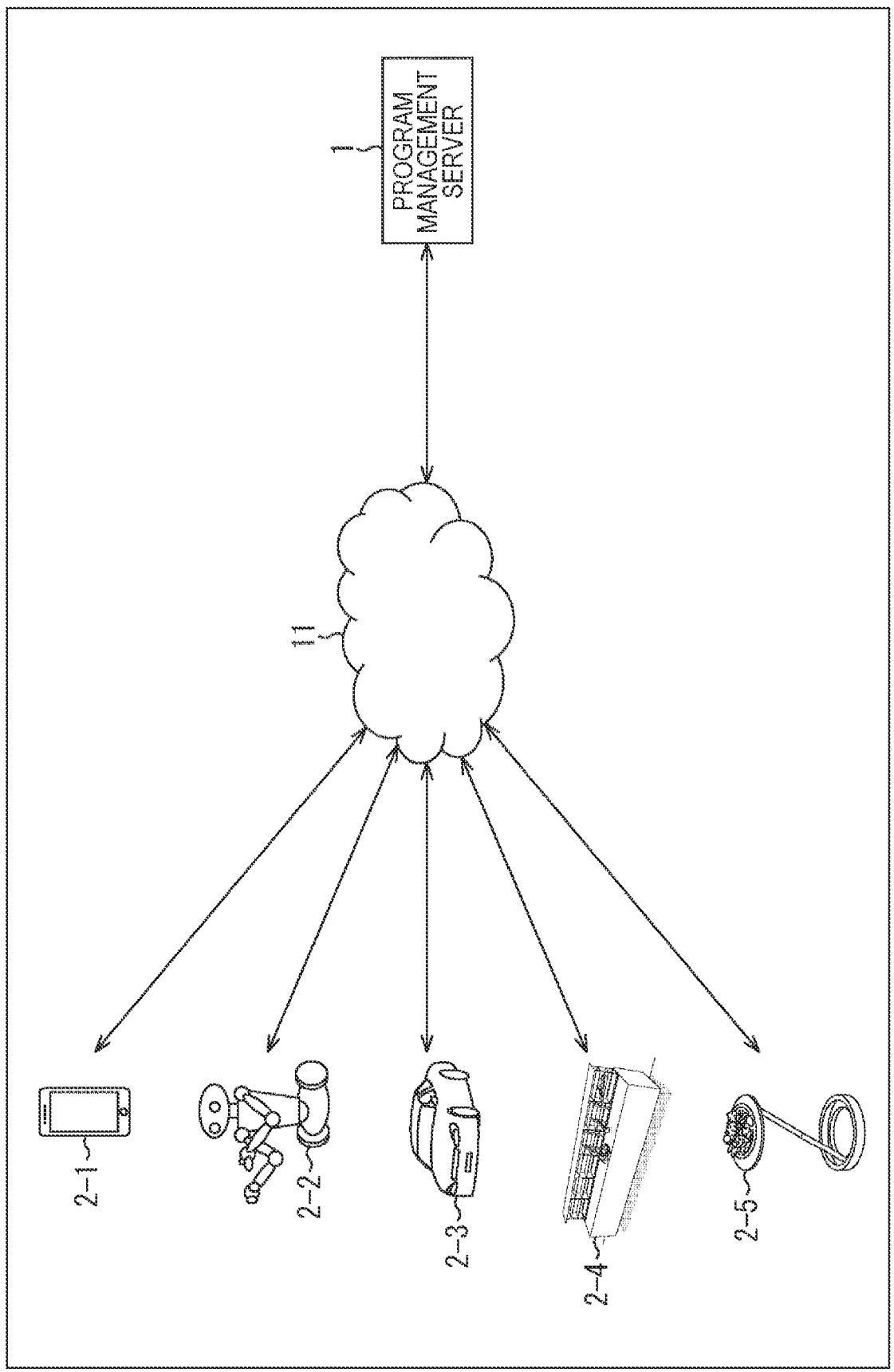
FIG. 1 is a view illustrating a configuration example of a program providing system according to one embodiment of the present technology.

FIG. 1 is a view illustrating a configuration example of a program providing system according to one embodiment of the present technology.

The program providing system in FIG. 1 is formed by connecting various devices such as a mobile terminal 2-1, an arm robot 2-2, a moving body 2-3, a cooking robot 2-4, and a conveyance robot 2-5 to a program management server 1 via a network 11 including the Internet and the like.

The mobile terminal 2-1 is a smartphone.

The arm robot 2-2 is a dual-arm robot. A carriage is provided in a casing of the arm robot 2-2. The arm robot 2-2 is a movable robot.

The moving body 2-3 is an automobile. A function of automated driving and the like is mounted on the moving body 2-3.

The cooking robot 2-4 is a kitchen-type robot. The cooking robot 2-4 has a function of cooking by driving a plurality of cooking arms. An operation similar to a cooking operation performed by a human is reproduced by the cooking arm.

The conveyance robot 2-5 is a robot on a top plate of which prepared as a placing table a conveyance object may be placed, the robot capable of moving to a destination position in this state. A wheel is provided on a base of the conveyance robot 2-5.

Each device illustrated in FIG. 1 is equipped with a sensor device used for sensing of environment, sensing of object, sensing of human and the like.

Figure 2:
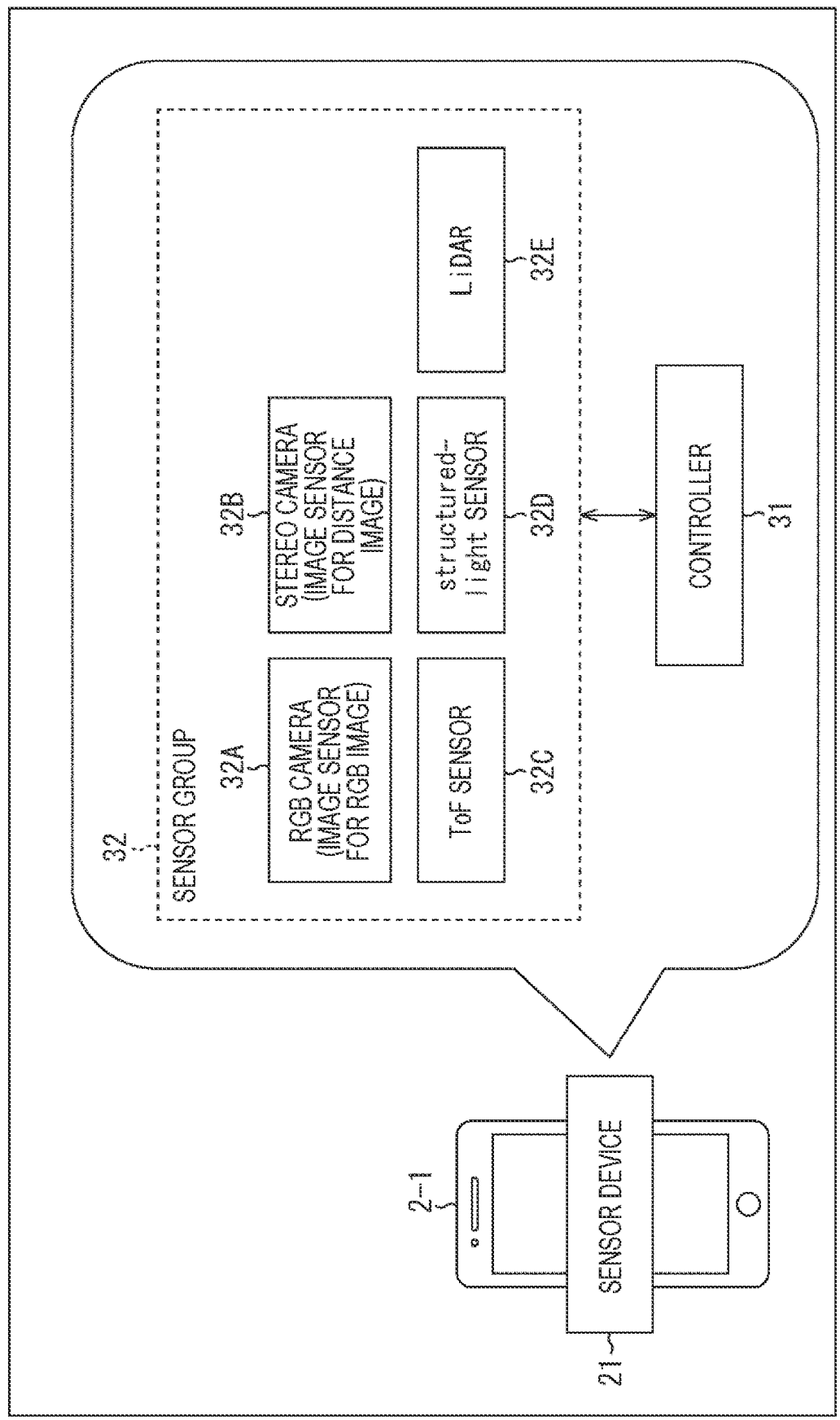
FIG. 2 is a view illustrating a configuration example of a sensor device.

FIG. 2 is a view illustrating a configuration example of the sensor device.

As illustrated in FIG. 2, a sensor device 21 is provided with a controller 31 and a sensor group 32.

The controller 31 controls each sensor forming the sensor group 32 to perform sensing of various targets such as the sensing of environment, sensing of object, and sensing of human. The sensing by the controller 31 is performed on the basis of sensor data output from each sensor forming the sensor group 32.

The controller 31 outputs a sensing result to a device on a host side. Various types of processing are performed by the device on the host side on the basis of the sensing result by the controller 31. In a case where the sensor device 21 is mounted on the mobile terminal 2-1, a central processing unit (CPU) of the mobile terminal 2-1 serves as the device on the host side. The controller 31 also has a function of communicating with the device on the host side.

The sensor group 32 includes a plurality of sensors that performs the sensing of various targets. In the example in FIG. 2, the sensor group 32 includes an RGB camera 32A, a stereo camera 32B, a ToF sensor 32C, a structured-light sensor 32D, and a LiDAR 32E.

The RGB camera 32A includes an image sensor for an RGB image. The RGB camera 32A images a peripheral state by driving the image sensor, and outputs the RGB image acquired by the imaging as the sensor data.

The stereo camera 32B is a distance sensor of a stereo camera system, and includes two image sensors for a distance image. The stereo camera 32B outputs the distance image indicating a distance to a target as the sensor data.

The ToF sensor 32C is a distance sensor of a time of flight (ToF) system. The ToF sensor 32C measures the distance to the target by the ToF system, and outputs distance information as the sensor data.

The structured-light sensor 32D is a distance sensor of a structured-light system. The structured-light sensor 32D measures the distance to the target by the structured-light system, and outputs distance information as the sensor data.

A light detection and ranging (LiDAR) 32E measures a three-dimensional position of each point of the target, and outputs information indicating a measurement result as the sensor data.

Sensors different from the sensors illustrated in FIG. 2 such as a positioning sensor, a gyro sensor, an acceleration sensor, a temperature sensor, and an illuminance sensor may be included in the sensor group 32.

A type of the sensor forming the sensor group 32 is appropriately changed depending on the device on which the sensor device 21 is mounted. One sensor may form the sensor group 32.

Figure 3:
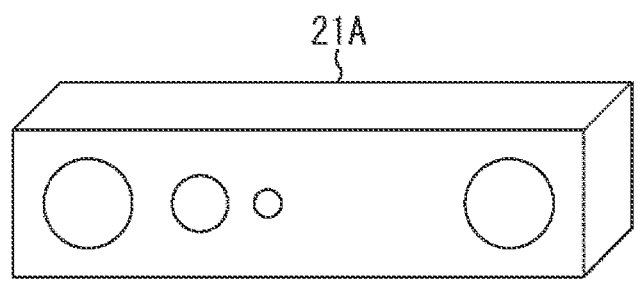
FIG. 3 is a view illustrating an example of an appearance of the sensor device.

The sensor device 21 may include a substrate on which the controller 31 and the sensor group 32 are arranged, or may be formed as a device in which the substrate on which each sensor is arranged is accommodated in a casing 21A as illustrated in FIG. 3.

In the sensor device 21 having such a configuration, the controller 31 executes a sensing program, which is a program for sensing, and implements a sensing function of various targets such as the environment, object, and human. The sensing function of the controller 31 is implemented on the basis of an output of one sensor forming the sensor group 32 or on the basis of a combination of outputs of a plurality of sensors.

The environment sensing (sensing of environment) includes, for example, the following.

- Imaging of RGB image using RGB camera 32A
- Measurement of distance to target using outputs of stereo camera 32B, ToF sensor 32C, and structured-light sensor 32D
- Generation of three-dimensional map using output of LiDAR 32E
- Estimation of self-position using three-dimensional map The environment sensed by the sensor device 21 includes various physical states that are states outside the sensor device 21 or outside the device on which the sensor device 21 is mounted that may be expressed as quantitative data by performing the sensing.

The object sensing (sensing of object) includes, for example, the following.

- Recognition and identification of target using RGB image imaged by RGB camera 32A
- Measurement of characteristic of target such as shape, size, color, and temperature The object sensed by the sensor device 21 includes various stationary objects and moving objects around the sensor device 21 or around the device on which the sensor device 21 is mounted.

The human sensing (sensing of human) includes, for example, the following.

- Recognition of human, recognition of face of human, identification of human using RGB image imaged by RGB camera 32A
- Recognition of specific parts of person such as head, arms, hands, eyes, and nose
- Estimation of position of specific parts including bone estimation
- Estimation of physical feature of human such as body height and body weight
- Estimation of attribute of human such as age and sex The human sensed by the sensor device 21 includes a human around the sensor device 21 or around the device on which the sensor device 21 is mounted.

The controller 31 includes a plurality of programs with different algorithms as the sensing programs for implementing the respective sensing functions.

Figure 4:
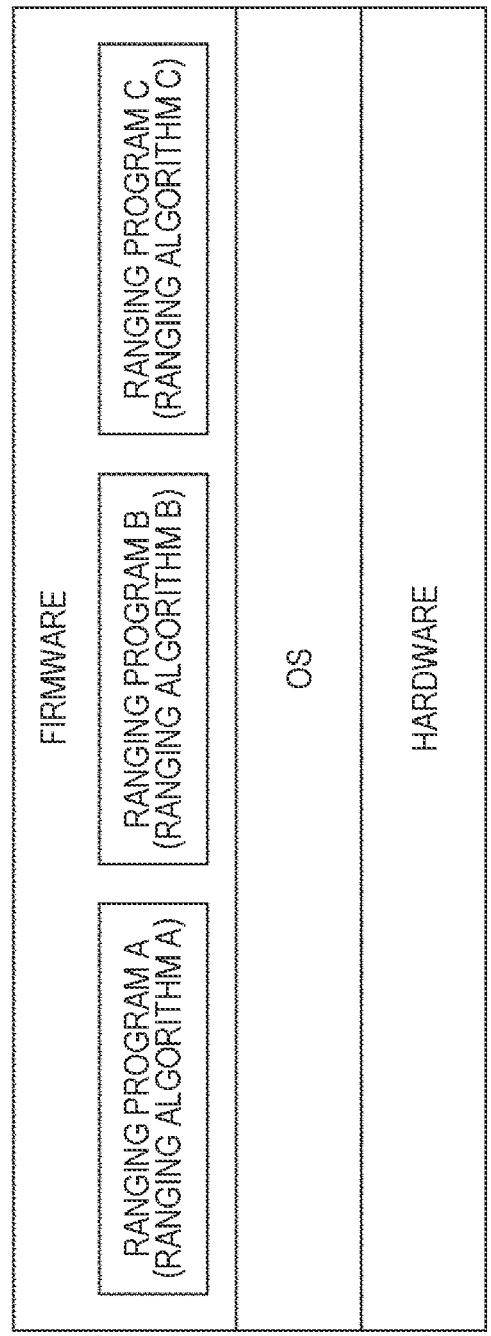
FIG. 4 is a view illustrating an example of a sensing program.

FIG. 4 is a view illustrating an example of the sensing program prepared in the sensor device 21.

In the example in FIG. 4, a ranging program A, a ranging program B, and a ranging program C are prepared as firmware that operates on an operating system (OS). The ranging program A, the ranging program B, and the ranging program C are the sensing programs that implement a ranging function as a human sensing function.

The ranging program A, the ranging program B, and the ranging program C are the sensing programs that implement the same ranging function by different sensing algorithms. The ranging program A, the ranging program B, and the ranging program C define the different sensing algorithms.

The ranging program A is the sensing program that performs ranging by a ranging algorithm A. The ranging program B is the sensing program that performs ranging by a ranging algorithm B. The ranging program C is the sensing program that performs ranging by a ranging algorithm C.

For example, the ranging algorithms A to C are the sensing algorithms to perform the ranging using different parameters: different parameters are set in the same sensor and the distance is calculated by performing the same calculation on the basis of the output of the sensor.

Furthermore, the ranging algorithms A to C are the sensing algorithms to perform the ranging using different calculation methods: the same parameter is set in the same sensor and the distance is calculated by performing different calculations on the basis of the output of the sensor.

In a case where a plurality of distance sensors such as the stereo camera 32B, the ToF sensor 32C, and the structured-light sensor 32D is prepared, the ranging algorithms A to C may be the sensing algorithms to perform ranging using different distance sensors.

In this case, for example, the ranging algorithm A performs the ranging on the basis of the output of the stereo camera 32B, and the ranging algorithm B performs the ranging on the basis of the output of the ToF sensor 32C. Furthermore, the ranging algorithm C performs the ranging on the basis of the output of the structured-light sensor 32D.

In this manner, in the sensor device 21, a plurality of programs with different sensing algorithms is prepared as the sensing programs for implementing the same ranging function. The sensor used for the ranging is associated with at least any one of each sensing algorithm or a sensing program that defines each sensing algorithm. In a case where the sensing program is executed, an operation of the associated sensor is controlled in conjunction with this.

For example, in the sensor device 21 mounted on the conveyance robot 2-5, the sensing algorithm corresponding to a sensing condition is selected and the ranging is performed. The sensing condition is a condition of selection of the sensing algorithm determined according to a situation of the conveyance robot 2-5.

For example, in a case where the situation is suitable for the ranging algorithm A, the ranging program A is executed, and the ranging is performed using the ranging algorithm A. Furthermore, in a case where the situation is suitable for the ranging algorithm B, the ranging program B is executed, and the ranging is performed using the ranging algorithm B. In a case where the situation is suitable for the ranging algorithm C, the ranging program C is executed, and the ranging is performed using the ranging algorithm C.

Since the ranging is performed by adaptively selecting the sensing algorithm (sensing program) corresponding to the sensing condition, the ranging by an optimal sensing algorithm becomes possible. The same applies to a case where the sensing target is other than the distance.

One sensing program defines one sensing algorithm. Selecting the sensing program corresponds to selecting the sensing algorithm.

Note that, adaptively selecting the sensing algorithm means selecting the sensing algorithm associated with the sensing condition when this condition is detected. The sensing algorithm considered to be suitable is associated with the sensing condition corresponding to each assumed situation. The association between the sensing condition and the sensing algorithm may be dynamically changed.

Figure 5:
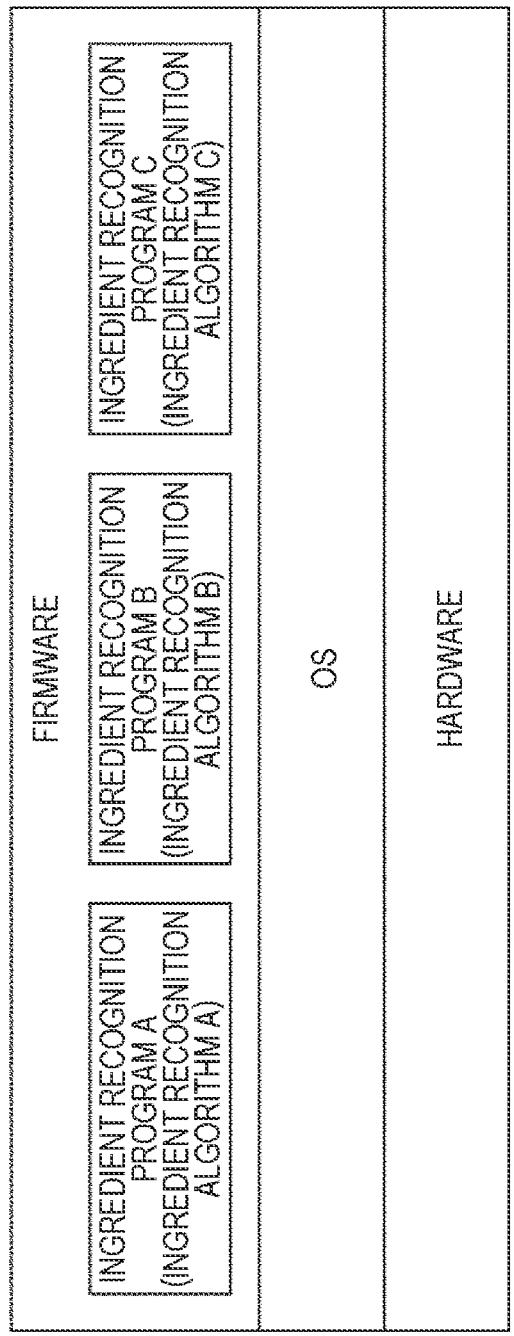
FIG. 5 is a view illustrating another example of the sensing program.

FIG. 5 is a view illustrating another example of the sensing program.

In the example in FIG. 5, an ingredient recognition program A, an ingredient recognition program B, and an ingredient recognition program C are prepared as the firmware that operates on the OS. The ingredient recognition programs A to C are the sensing programs that implement an ingredient recognition function as the object sensing function.

The ingredient recognition program A is the sensing program that performs ingredient recognition by an ingredient recognition algorithm A. The ingredient recognition program B is the sensing program that performs ingredient recognition by an ingredient recognition algorithm B. The ingredient recognition program C is the sensing program that performs ingredient recognition by an ingredient recognition algorithm C. For example, in the sensor device 21 mounted on the cooking robot 2-4, the sensing algorithm corresponding to the sensing condition determined by a cooking process and the like is selected and the ingredient is recognized.

Figure 6:
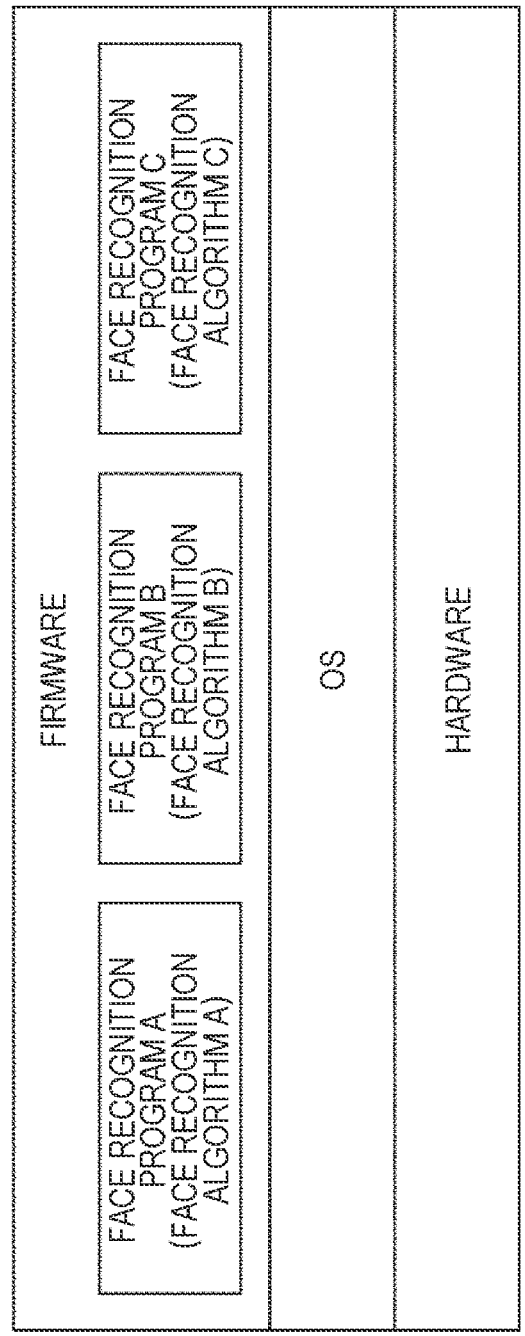
FIG. 6 is a view illustrating still another example of the sensing program.

FIG. 6 is a view illustrating still another example of the sensing program.

In the example in FIG. 6, a face recognition program A, a face recognition program B, and a face recognition program C are prepared as the firmware that operates on the OS. The face recognition programs A to C are the sensing programs that implement a face recognition function as the human sensing function.

The face recognition program A is the sensing program that performs face recognition by a face recognition algorithm A. The face recognition program B is the sensing program that performs face recognition by a face recognition algorithm B. The face recognition program C is the sensing program that performs face recognition by a face recognition algorithm C. For example, in the sensor device 21 mounted on the cooking robot 2-4, the sensing algorithm corresponding to the sensing condition determined by the cooking process and the like is selected and the face is recognized.

Updating of Sensing Program

In the program providing system in FIG. 1, the sensing program prepared as the firmware in the sensor device 21 of each device may be updated.

Figure 7:
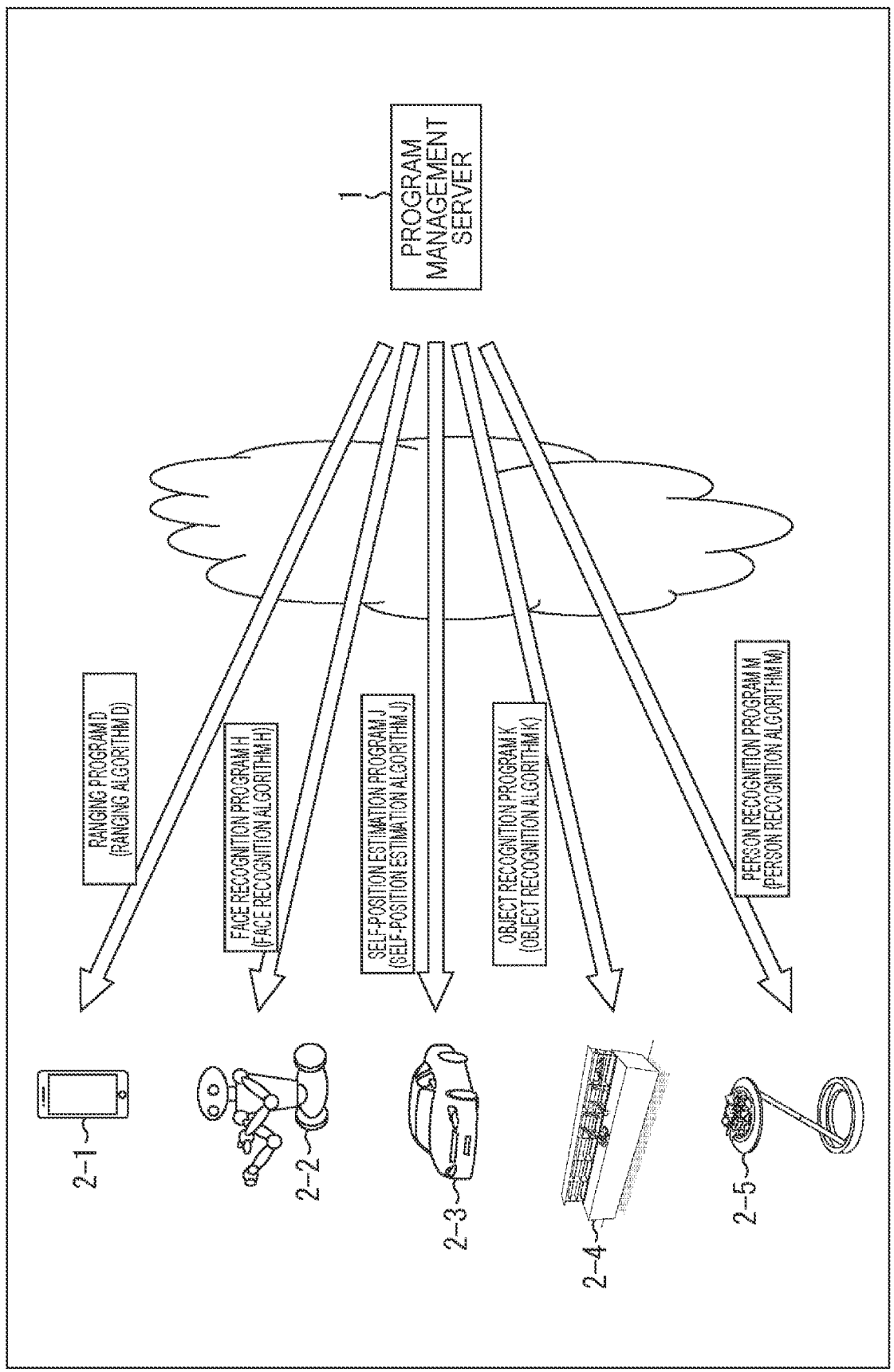
FIG. 7 is a view illustrating an example of updating of the sensing program.

FIG. 7 is a view illustrating an example of updating of the sensing program.

As indicated by an arrow in FIG. 7, the program management server 1 provides the sensing program to each device. The program management server 1 includes a data base (DB) of the sensing program to be provided to each device.

In the example in FIG. 7, a ranging program D that performs the ranging by a ranging algorithm D is provided to the mobile terminal 2-1, and a face recognition program H that performs the face recognition by a face recognition algorithm H is provided to the arm robot 2-2.

Furthermore, a self-position estimation program J that performs self-position estimation by a self-position estimation algorithm J is provided to the moving body 2-3, and an object recognition program K that performs object recognition by an object recognition algorithm K is provided to the cooking robot 2-4. A person recognition program M that performs person recognition by a person recognition algorithm M is provided to the conveyance robot 2-5.

Figure 8:
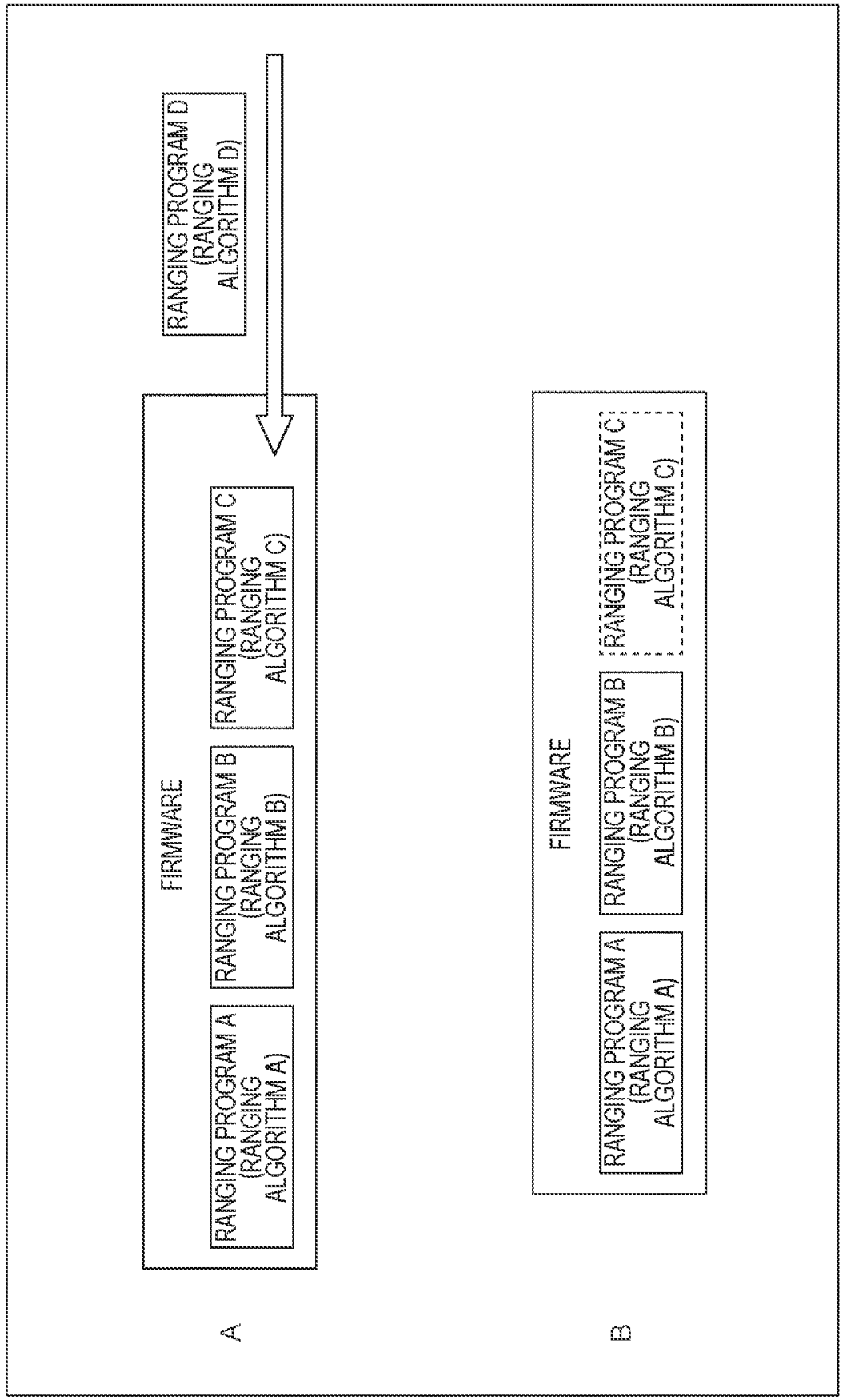
FIG. 8 is a view illustrating an example of updating of the sensing program.

FIG. 8 is a view illustrating an example of updating of the sensing program.

In the sensor device 21 of each device, the sensing program may be added as illustrated in A of FIG. 8. In the example in A of FIG. 8, the ranging program D that performs the ranging by the ranging algorithm D is added to the ranging programs A to C that perform the ranging by the ranging algorithms A to C, respectively.

In a default state, the sensing program that defines the sensing algorithm corresponding to a general situation is prepared in the sensor device 21 of each device. Even in a case of a situation to which the sensor device 21 of each device cannot respond with the sensing program prepared in advance, this may respond to a special situation by adding the sensing program that defines the sensing algorithm corresponding to such special situation.

Furthermore, as illustrated in B of FIG. 8, it is also possible to delete (uninstall) an unnecessary program. In the example in B of FIG. 8, the ranging program C out of the ranging programs A to C is deleted as indicated by a broken line frame.

Figure 9:
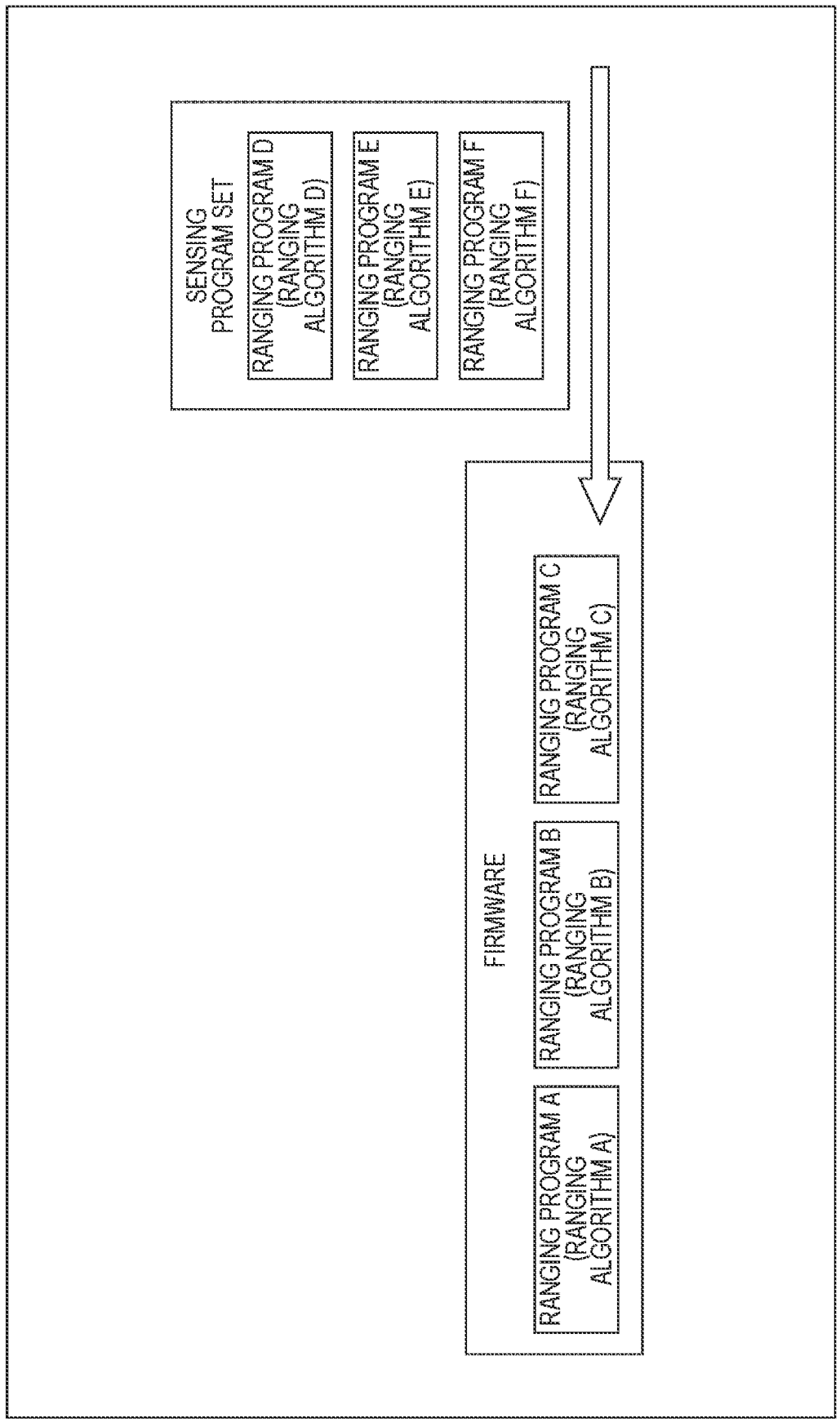
FIG. 9 is a view illustrating another example of updating of the sensing program.

FIG. 9 is a view illustrating another example of updating of the sensing program.

As illustrated in FIG. 9, the updating may be performed in units of sensing program set including a plurality of sensing programs. In the example in FIG. 9, a sensing program set including the ranging program D that performs the ranging by the ranging algorithm D, a ranging program E that performs the ranging by a ranging algorithm E, and a ranging program F that performs the ranging by a ranging algorithm F is provided by the program management server 1 to be added.

Figure 10:
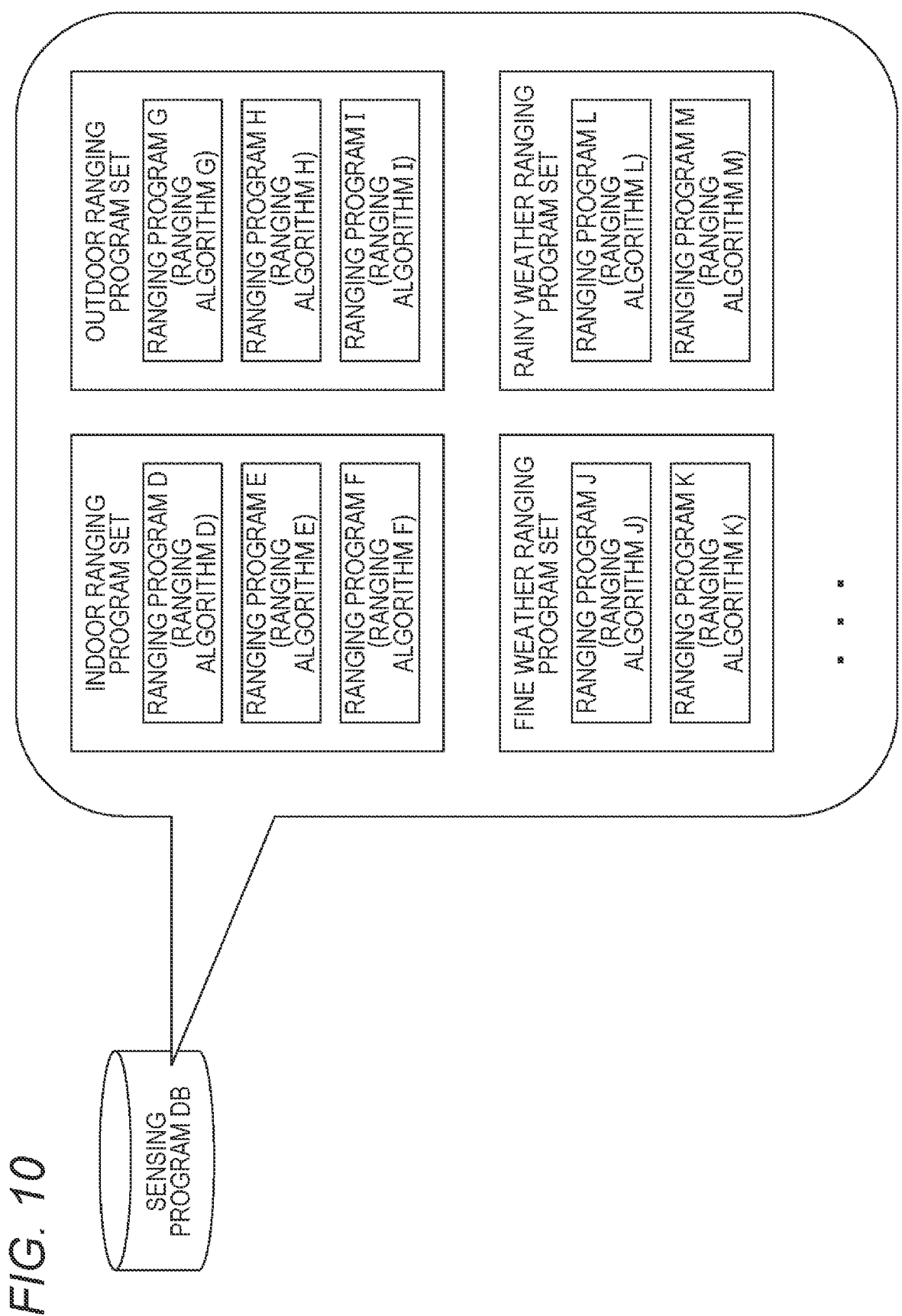
FIG. 10 is a view illustrating an example of a sensing program set.

In the DB of the program management server 1, as illustrated in FIG. 10, a plurality of sensing program sets in which a plurality of sensing programs is collected for each use condition such as a place, a situation, and a purpose is prepared.

In the example in FIG. 10, a sensing program set for indoor ranging and a sensing program set for outdoor ranging are prepared. These sensing program sets are the sensing program sets corresponding to places.

The sensing program set corresponding to the place is, for example, the set used in the sensor device 21 mounted on a device having a moving function. Among the same indoors, the sensing program sets may be prepared in units of finer places such as a sensing program set for a kitchen and a sensing program set for a dining room.

It is also possible to prepare the sensing program sets for various places such as a sensing program set for the sea, a sensing program set for a mountain, and a sensing program set for inside of a train.

Furthermore, in the example in FIG. 10, a sensing program set for ranging in fine weather and a sensing program set for ranging in rainy weather are prepared. These sensing program sets are the sensing program sets corresponding to weather.

The sensing program set corresponding to weather is, for example, the set used in the sensor device 21 mounted on a device having a moving function and may move outdoors. It is also possible to prepare the sensing program sets for various changing situations such as a sensing program set for each time of the day such as morning, noon, and night, a sensing program set for each brightness, and a sensing program set for each temperature.

It is also possible to prepare the sensing program sets for various purposes such as a sensing program set when running, a sensing program set when playing baseball, a sensing program set when cooking curry, and a sensing program set when cooking salad.

The sensor device 21 of each device may collectively add the sensing programs by specifying an ID of the sensing program set corresponding to a use condition. The ID as identification data is set in each sensing program set. The ID as the identification data is also set in each sensing program forming the sensing program set.

Figure 11:
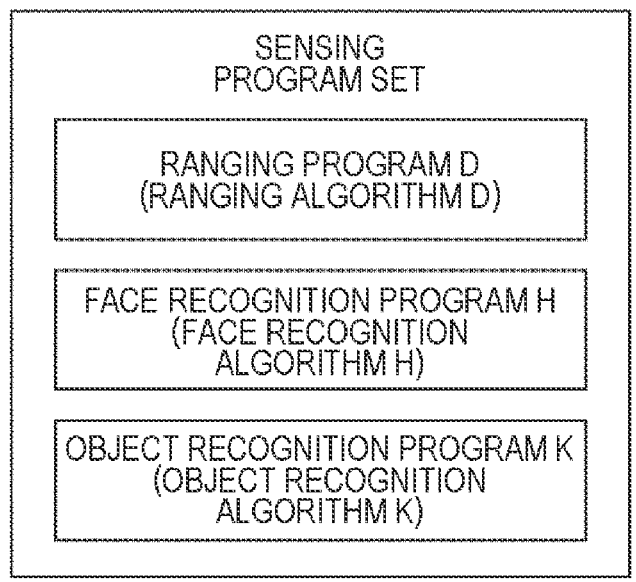
FIG. 11 is a view illustrating an example of the sensing program set.

In place of the set of the sensing programs that implement the same ranging function by different sensing algorithms, the set of the sensing programs that implements different functions may be added as illustrated in FIG. 11.

In the example in FIG. 11, the sensing program set includes the ranging program D, the face recognition program H, and the object recognition program K. The ranging program D is the sensing program that performs the ranging by the ranging algorithm D, and the face recognition program H is the sensing program that performs the face recognition by the face recognition algorithm H. The object recognition program K is the sensing program that performs the object recognition by the object recognition algorithm K.

Figure 12:
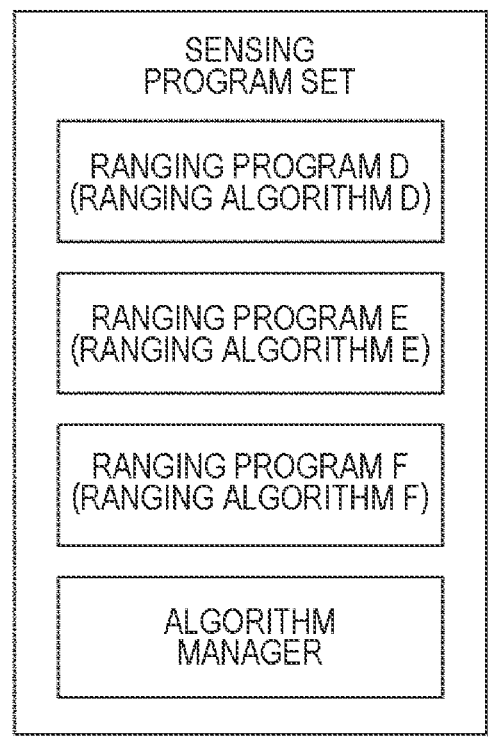
FIG. 12 is a view illustrating an example of the sensing program set.

FIG. 12 is a view illustrating an example of the sensing program set.

The sensing program set illustrated in FIG. 12 includes an algorithm manager that is a program that controls adaptive selection of the algorithm.

The sensor device 21 executes the algorithm manager and selects the sensing algorithm corresponding to the sensing condition. In the algorithm manager, a combination of information indicating a type of the sensing program that controls the execution and information indicating execution order of the sensing programs is set. In this manner, the algorithm manager may be prepared for each sensing program set.

Figure 13:
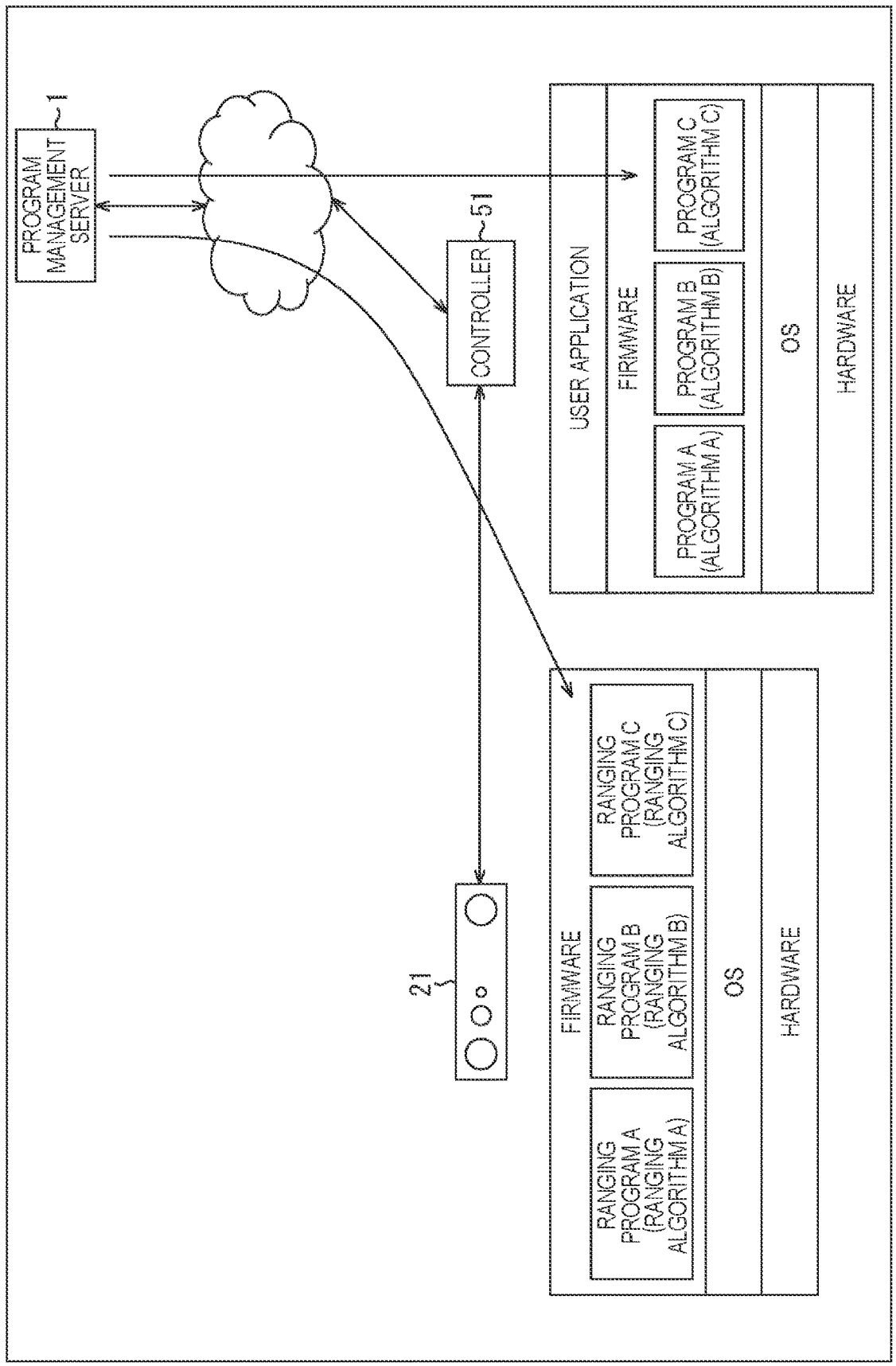
FIG. 13 is a view illustrating an example of updating of the sensing program.

FIG. 13 is a view illustrating an example of updating of the sensing program.

The sensing program may be executed in each of the sensor device 21 and a controller 51, which is the device on the host side, and a predetermined function such as the ranging function may be implemented. In this case, the sensing program of the controller 51 may be updated similarly to the sensing program of the sensor device 21. The controller 51 is, for example, a data processing device on the host side such as the CPU of the mobile terminal 2-1 and a CPU of a PC mounted on the arm robot 2-2.

A sensing program that updates the firmware of the sensor device 21 and a sensing program that updates the firmware of the controller 51 may be included in one sensing program set to be provided.

The sensing program and the sensing program set may be provided for a fee or for free. One sensing program set may include both a paid sensing program and a free sensing program.

When updating the sensing program as described above, the sensor device 21 may be authenticated by the program management server 1 on the basis of key information for authentication, and the updating may be performed in a case where it is confirmed that the sensor device is a legitimate device. The key information for authentication is prepared as unique information in each sensor device 21.

The authentication of the sensor device 21 using the key information for authentication may be performed not when the sensing program is updated but when the sensing program is executed.

Provision Source of Sensing Program

Figure 14:
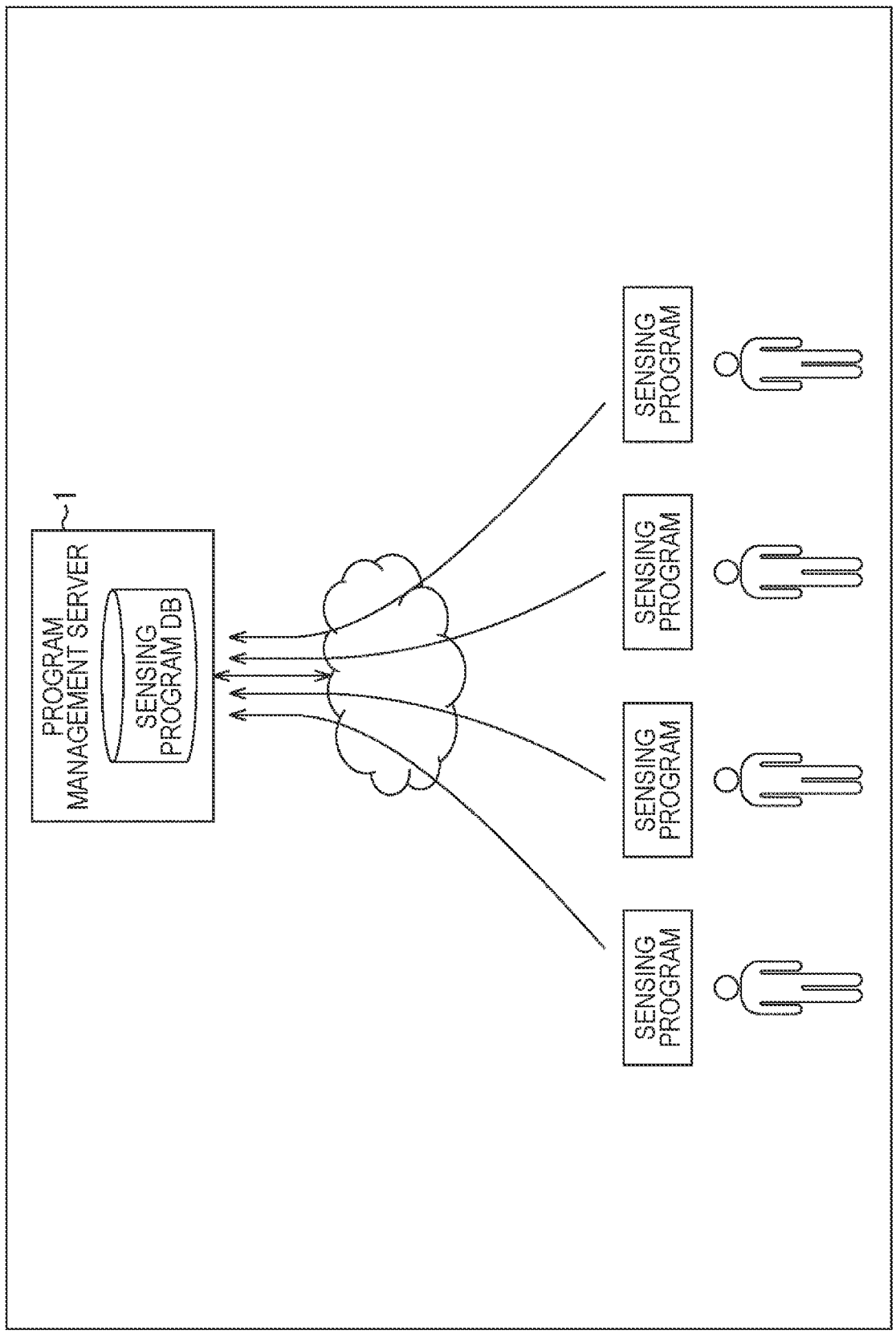
FIG. 14 is a view illustrating an example of a provision source of the sensing program.

FIG. 14 is a view illustrating an example of a provision source of the sensing program.

As illustrated in FIG. 14, the sensing program provided from the program management server 1 to each device is developed by, for example, a developer that performs user registration of a service in the program providing system. Each developer is provided with information regarding a specification of the sensor device 21 and a development tool such as a software development kit (SDK) by a service provider that operates the service using the program providing system.

Each developer develops the sensing program or the sensing program set by using the SDK and the like, and uploads the same from its own computer to the program management server 1. The uploaded sensing program and sensing program set are stored in the sensing program DB to be managed.

The program management server 1 manages a using situation of each sensing program and sensing program set such as the number of times of installation and the number of times of execution in each device. A predetermined incentive such as payment of an amount of money corresponding to the using situation and issuance of points may be provided from the service provider to the developer.

Figure 15:
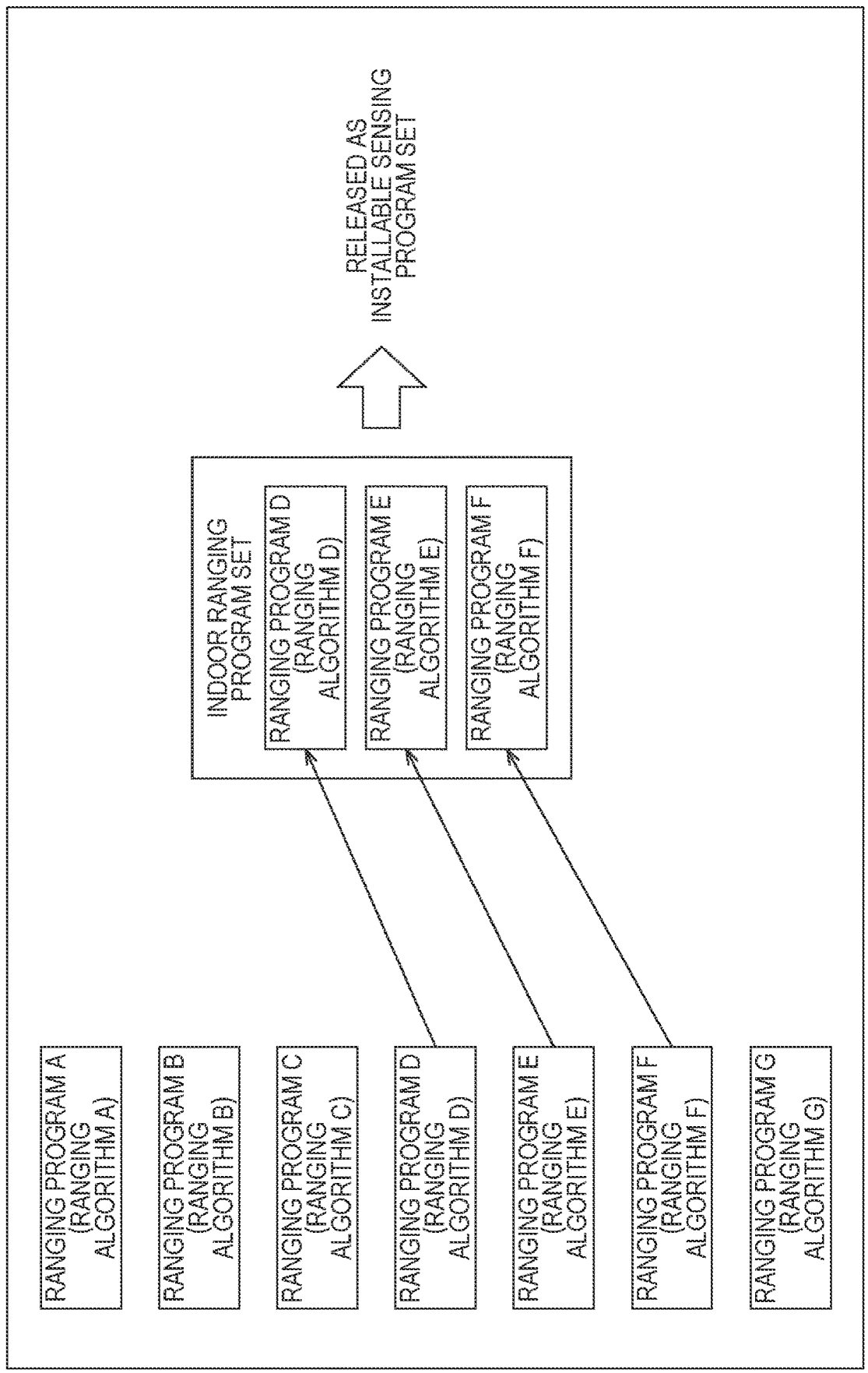
FIG. 15 is a view illustrating an example of generation of the sensing program set.

FIG. 15 is a view illustrating an example of generation of the sensing program set.

The sensing program set may be generated by any user by putting together the sensing programs developed and uploaded by each developer.

In the example in FIG. 15, the indoor ranging program set is generated by putting together three sensing programs: the ranging program D, the ranging program E, and the ranging program F among the ranging programs A to G.

The indoor ranging program set generated in this manner is released by the program management server 1 as an installable sensing program set, and is installed on a predetermined device.

An incentive may be provided to the user who generates the sensing program set by putting together the plurality of sensing programs.

<Use Case of Sensing Program>

Use Case of Conveyance Robot

Here, a use case a the human sensing is described.

For example, in a case where the conveyance robot 2-5 conveys a dish as the conveyance object, that is, serves the dish in a store such as a restaurant, the sensor device 21 mounted on the conveyance robot 2-5 performs the human sensing according to the sensing program. In order to serve the dish to a person who orders the same, it is required to recognize people around and specify the person who orders the dish.

Figure 16:
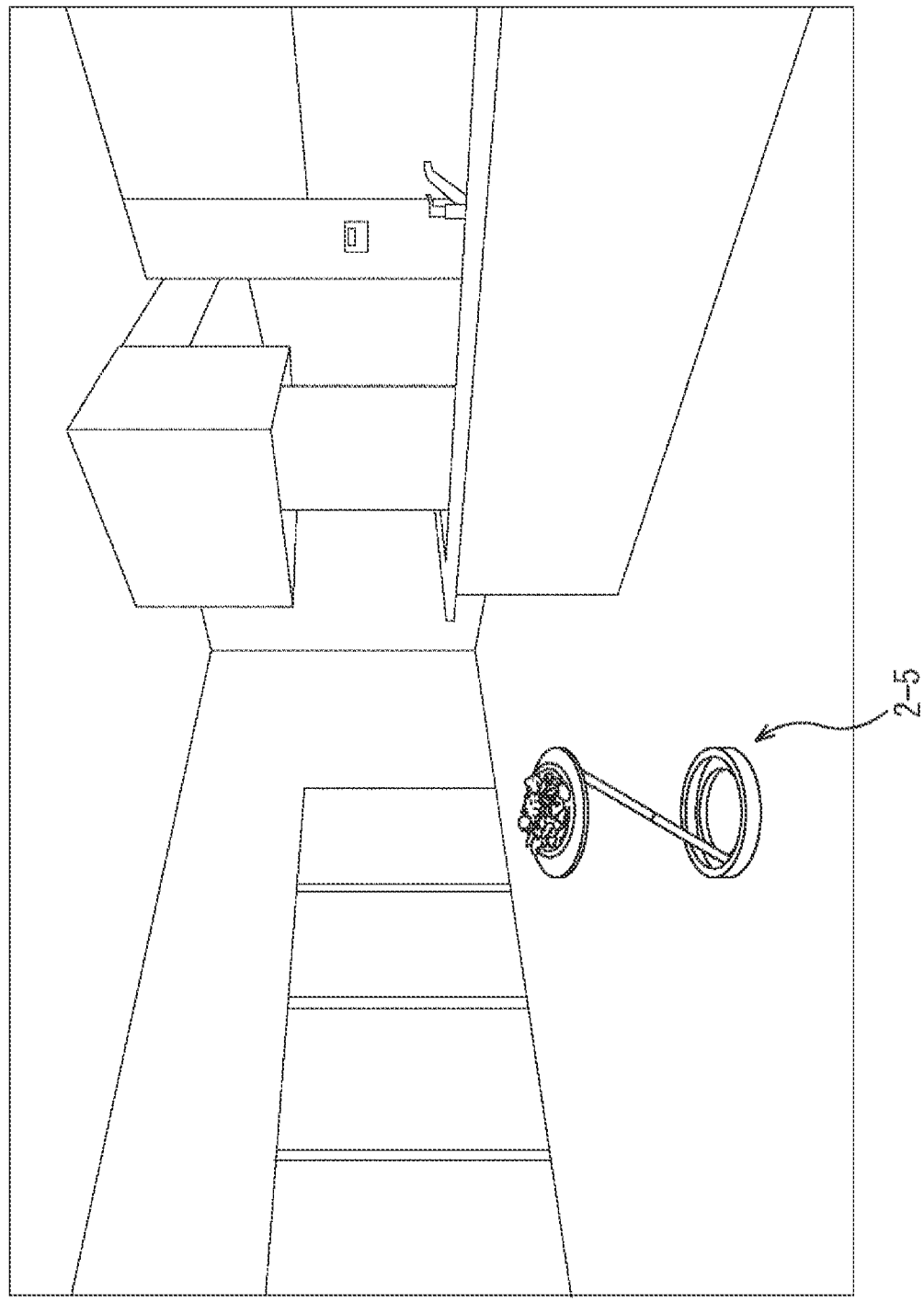
FIG. 16 is a view illustrating a state of conveyance by a conveyance robot.

FIG. 16 is a view illustrating a state of conveyance by the conveyance robot 2-5.

FIG. 16 illustrates a state of the conveyance robot 2-5 that moves in a kitchen in a building. A cooked dish is placed on the top plate prepared as the placing table for the conveyance object. In this example, the conveyance robot 2-5 is used for serving the dish.

The conveyance robot 2-5 plans a moving route, avoids an obstacle and the like on the basis of a result of the human sensing by the sensor device 21, moves to a destination, and serves the dish. Furthermore, the conveyance robot 2-5 controls a customer service on the basis of the result of the human sensing by the sensor device 21.

Figure 17:
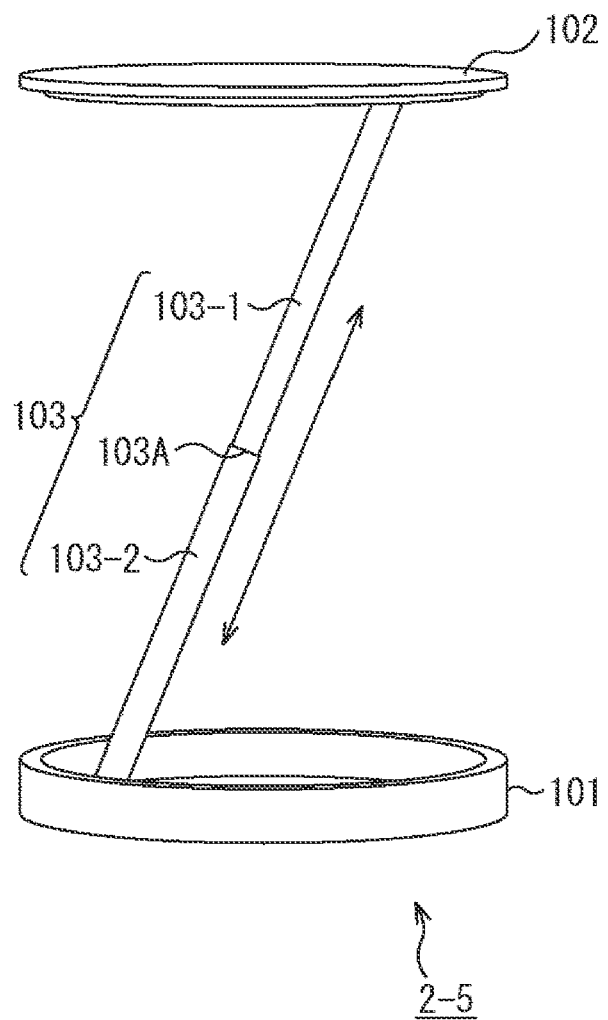
FIG. 17 is an enlarged view of an appearance of the conveyance robot.

FIG. 17 is an enlarged view of an appearance of the conveyance robot 2-5.

As illustrated in FIG. 17, the conveyance robot 2-5 is formed by connecting an annular base 101 and a circular thin plate-shaped top plate 102 with a thin rod-shaped support arm 103. A plurality of tires is provided on a bottom surface side of the base 101. The base 101 serves as a moving unit that implements the movement of the conveyance robot 2-5.

A radial length of the base 101 and a radial length of the top plate 102 are substantially the same. In a case where there is the top plate 102 substantially directly above the base 101, the support arm 103 is in an oblique state as illustrated in FIG. 17.

The support arm 103 includes an arm member 103-1 and an arm member 103-2. A diameter of the arm member 103-1 on the top plate 102 side is slightly smaller than a diameter of the arm member 103-2 on the base 101 side. When the arm member 103-1 is accommodated inside the arm member 103-2 at an extension/contraction unit 103A, a length of the support arm 103 is adjusted as indicated by a bidirectional arrow.

An angle of the support arm 103 may be adjusted at each of a connection between the base 101 and the support arm 103 and a connection between the top plate 102 and the support arm 103.

Figure 18:
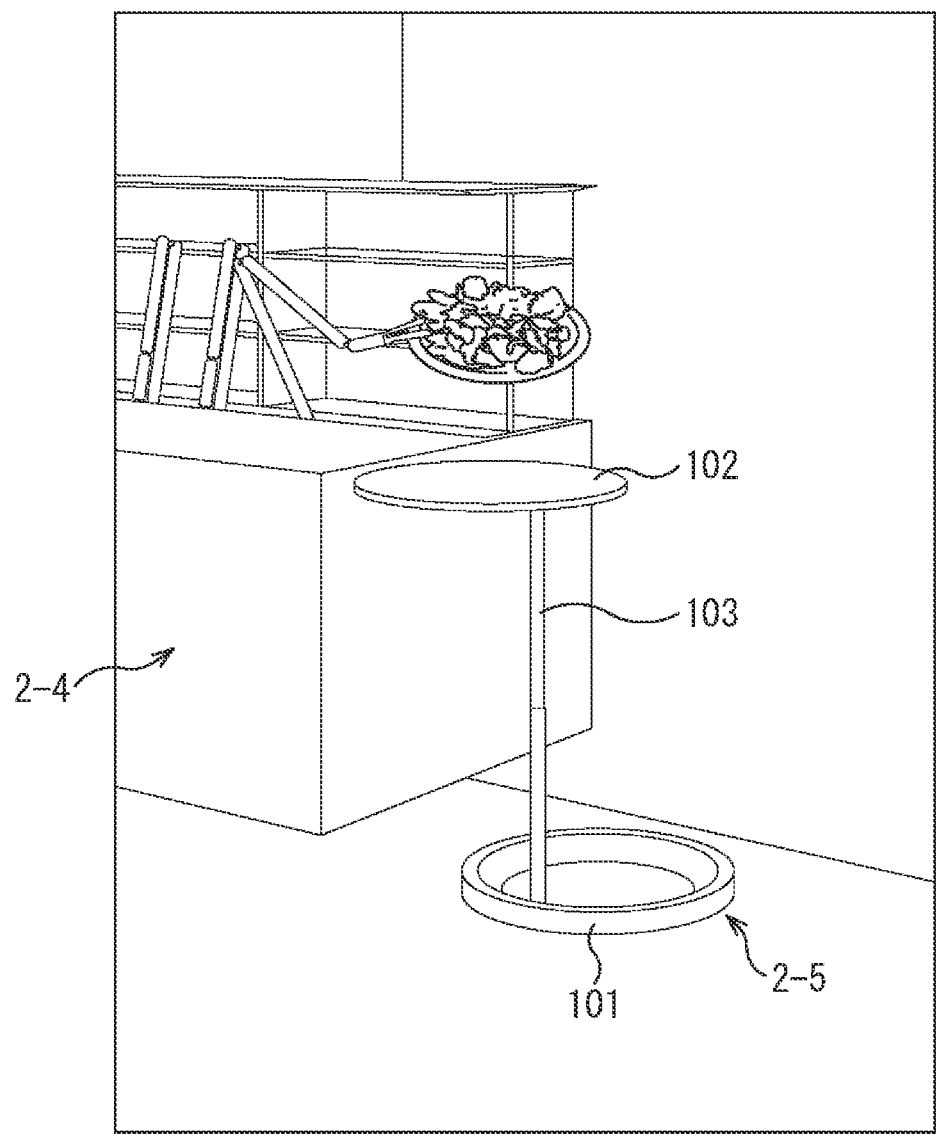
FIG. 18 is a view illustrating an example of an attitude of the conveyance robot when a dish is placed thereon.

FIG. 18 is a view illustrating an example of an attitude of the conveyance robot 2-5 when the dish is placed thereon.

In the example in FIG. 18, by setting the support arm 103 substantially vertically and setting the length thereof to a maximum length, a height of the top plate 102 is adjusted to be substantially the same as a height of a top plate of the cooking robot 2-4.

When the conveyance robot 2-5 is in such a state, the cooking arm of the cooking robot 2-4 places the dish on the top plate 102. In the example in FIG. 18, the dish completed by the cooking operation of the cooking robot 2-4 is placed by the cooking arm.

As illustrated in FIG. 18, the cooking robot 2-4 is provided with a plurality of cooking arms that performs various cooking operations such as cutting of an ingredient, roasting of the ingredient, and arrangement of the cooked ingredient. The cooking operation by the cooking arm is performed in accordance with cooking data that defines contents and order of the cooking operations. The cooking data includes information regarding each cooking process until the dish is completed.

In this manner, the dish served by the conveyance robot 2-5 is the dish cooked by the cooking robot 2-4. A dish made by a human may be placed on the top plate 102 by the human and served.

Figure 19:
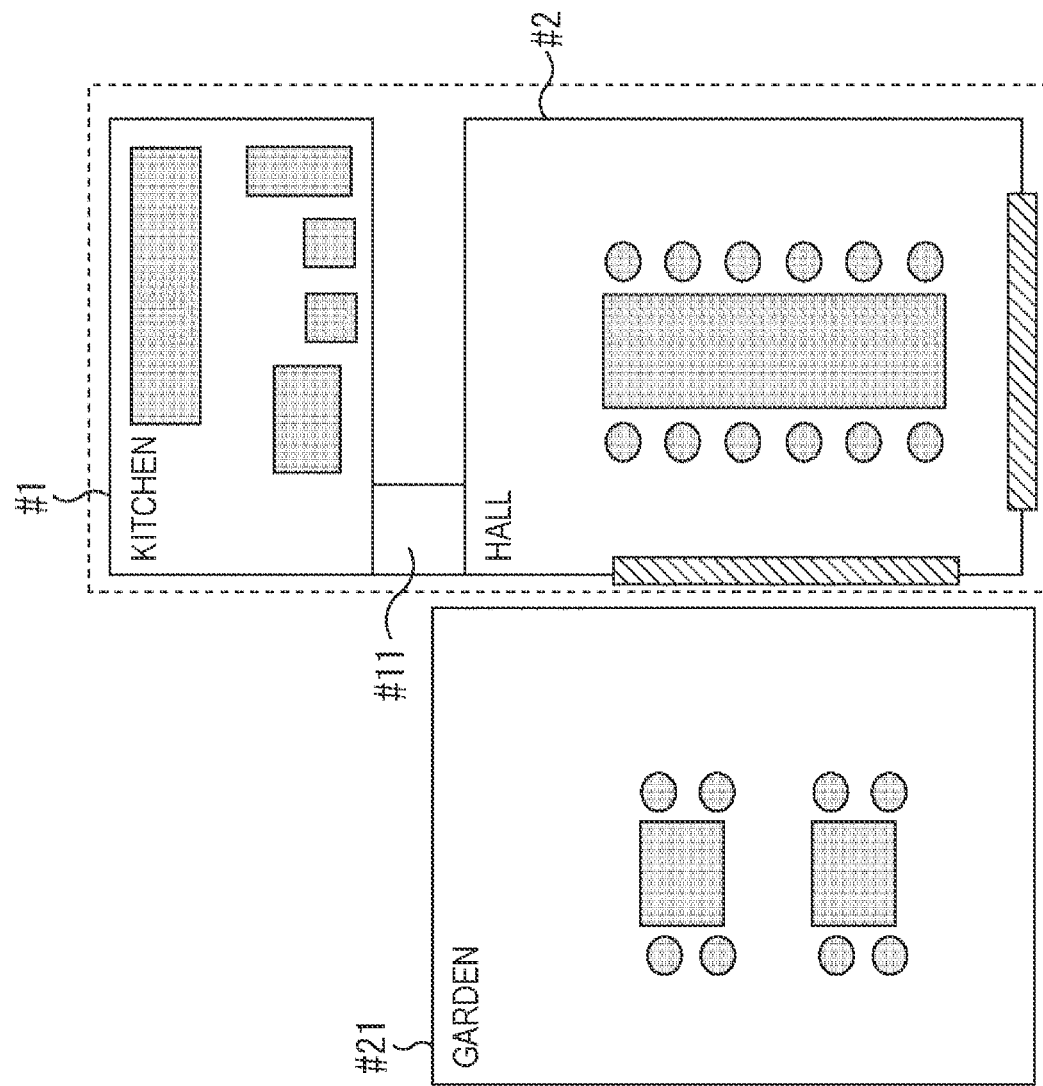
FIG. 19 is a plan view illustrating a layout of a space in which the conveyance robot moves.

FIG. 19 is a plan view illustrating a layout of a space in which the conveyance robot 2-5 moves.

As illustrated in FIG. 19, a kitchen #1 and a hall #2 are prepared in the restaurant in which the conveyance robot 2-5 moves. There is a corridor #11 between the kitchen #1 and the hall #2.

Outside a building in FIG. 19 a range of which is indicated by a broken line, a garden #21 is provided so as to face the hall #2. A table and the like for a customer to have a meal are prepared not only in the hall #2 but also in the garden #21.

A case where the conveyance robot 2-5 moves in such a space and performs a customer service is described. The customer service performed by the conveyance robot 2-5 includes reception of an order, serving of a dish, provision of a drink and the dike.

The human sensing by the sensor device 21 mounted on the conveyance robot 2-5 is performed using an algorithm corresponding to a human sensing condition set depending on a situation of the conveyance robot 2-5 such as a place where the conveyance robot 2-5 is located. The sensing program that performs the human sensing is adaptively selected according to the human sensing condition and executed by the sensor device 21.

Specific Example of Sensing Algorithm

Figure 20:
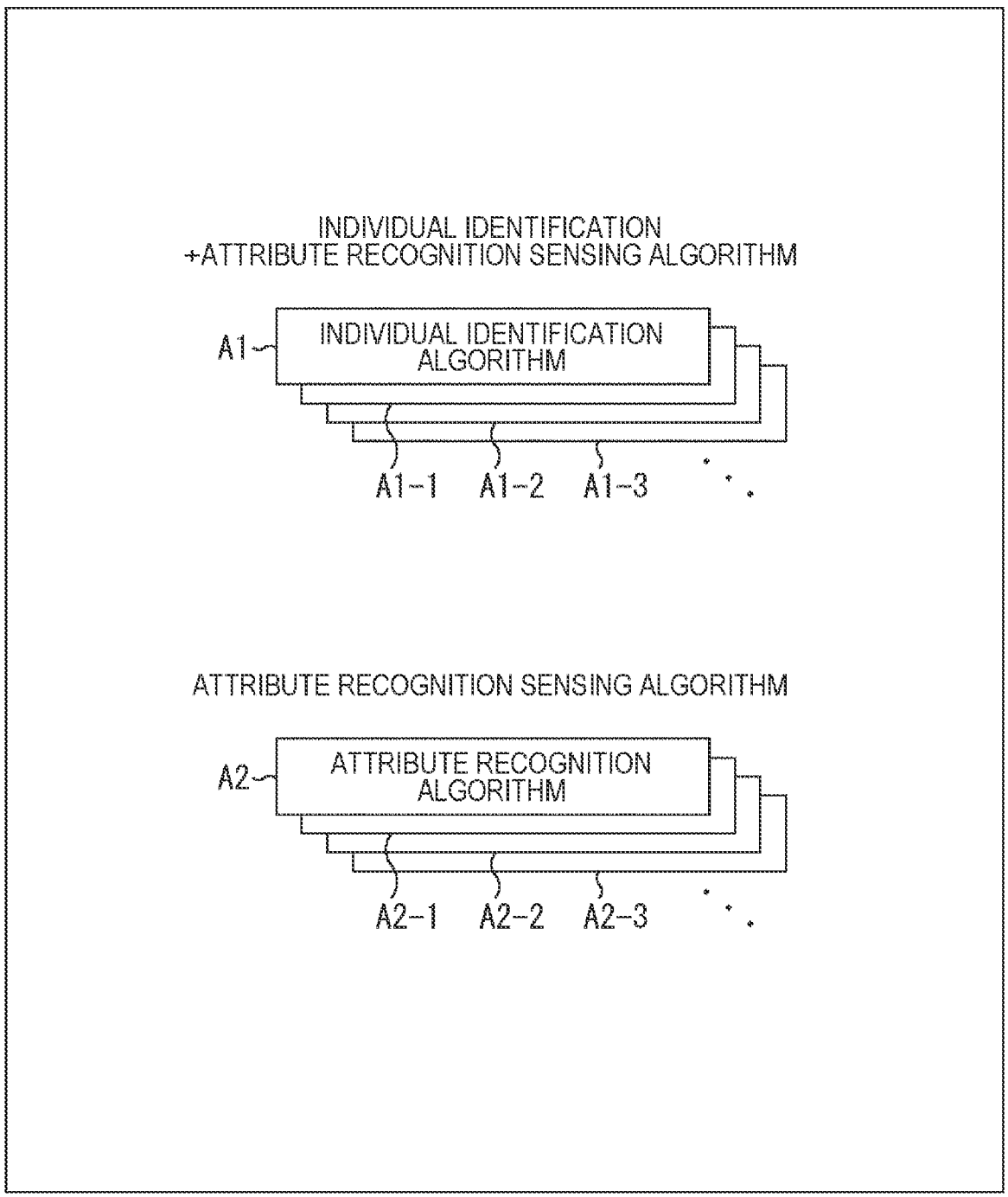
FIG. 20 is a view illustrating an example of a sensing algorithm.

FIG. 20 is a view illustrating an example of the sensing algorithm defined by the sensing program prepared in the conveyance robot 2-5.

As illustrated in FIG. 20, in the conveyance robot 2-5, an individual identification algorithm A1 and an attribute recognition algorithm A2 are prepared as the sensing algorithms used for the human sensing.

The individual identification algorithm A1 is the sensing algorithm used to identify who a target to be sensed is and to recognize an attribute of the target. The attribute of the target includes sex and age. Furthermore, the attribute of the target also includes features in appearance such as a dominant hand and a hair length.

In contrast, the attribute recognition algorithm A2 is the sensing algorithm used to recognize the attribute of the target. By the attribute recognition algorithm A2, the target is not identified and only the attribute of the target is recognized.

Furthermore, for each of the individual identification algorithm A1 and the attribute recognition algorithm A2, the sensing algorithm for each situation such as an indoor sensing algorithm, an outdoor sensing algorithm, a sensing algorithm for dark place and the like are prepared.

In FIG. 20, for example, an individual identification algorithm A1-1 is the indoor sensing algorithm, and an individual identification algorithm A1-2 is the outdoor sensing algorithm. Furthermore, an individual identification algorithm A1-3 is the sensing algorithm for dark place.

Similarly, an attribute recognition algorithm A2-1 is an indoor sensing algorithm, and an attribute recognition algorithm A2-2 is an outdoor sensing algorithm. Furthermore, an attribute recognition algorithm A2-3 is the sensing algorithm for dark place.

In this manner, in the conveyance robot 2-5, the sensing program that defines each individual identification algorithm A1 and the sensing program that defines each attribute recognition algorithm A2 corresponding to the human sensing condition set according to the situation are prepared. In the conveyance robot 2-5, the individual identification algorithm A1 or the attribute recognition algorithm A2 corresponding to the human sensing condition is selected, and the human sensing is performed.

The individual identification algorithm A1 and the attribute recognition algorithm A2 are prepared because a required sensing algorithm differs depending on a purpose such as whether it is required to specify who the target is together with the attribute or whether it is required to specify only the attribute.

Furthermore, the sensing algorithm for each situation is prepared for each of the individual identification algorithm A1 and the attribute recognition algorithm A2 because it is required to change processing in order to secure accuracy depending on a situation such as a place where the target is.

For example, in a case where the human sensing is performed in a dark place, a sensing algorithm resistant to a dark place (noise) is required.

Furthermore, in a case where the human sensing is performed outdoors, a sensing algorithm resistant to direct sunlight is required. Since the noise varies depending on weather such as rain and cloudiness, the sensing algorithm corresponding to each weather is required.

Moreover, since illuminance changes due to a lapse of time and a sudden change in weather, a sensing algorithm corresponding to each illuminance is required.

Here, switching of the individual identification algorithm A1 and the attribute recognition algorithm A2 for each use case is described.

Use Case 1

A use case 1 is the use case in which the conveyance robot 2-5 confirms entrance of a customer in the restaurant in FIG. 19.

In the use case 1, an attribute of the customer is recognized using the attribute recognition algorithm A2. On the basis of an attribute recognition result, for example, processing of determining a seat to which the customer is directed is performed by the conveyance robot 2-5.

Use Case 2

A use case 2 is the use case of confirming an amount and preference in cooking when receiving the order. In the use case 2, there are a case of using the individual identification algorithm A1 and a case of using the attribute recognition algorithm A2.

In the case of using the attribute recognition algorithm A2, the attribute of the customer is recognized using the attribute recognition algorithm A2.

For example, a person the order of whom is received and a person the order of whom is not received are identified on the basis of the attribute recognition result.

Furthermore, information of the attribute of the customer is stored on the basis of the attribute recognition result. The stored information is used for the customer service at the time of next visit and the like.

Moreover, a manner of receiving the order is determined on the basis of the attribute recognition result. For example, in a case where the customer is a woman, it is confirmed whether to reduce the amount when receiving the order. Furthermore, in a case where the customer is a child, a drink other than an alcoholic drink is suggested when a recommended drink is suggested.

In the case of using the individual identification algorithm A1, it is recognized who the target is together with the attribute using the individual identification algorithm A1.

A manner of receiving the order is determined on the basis of an individual identification result according to an order history of this person. For example, processing of presenting an order content in the previous visit or analyzing a preference of this person from the order history to suggest a recommended dish is performed. Furthermore, processing of suggesting a dish on the basis of the preference and information regarding intolerance of this person or explaining a menu in accordance with a background knowledge of this person is performed.

Use Case 3

A use case 3 is the use case of delivering (serving) a dish to a customer in the hall. In the use case 3, the attribute of the customer is recognized using the attribute recognition algorithm A2.

For example, the dish is delivered to an ordered target on the basis of the attribute recognition result. Furthermore, in a case where the attribute of the person to be preferentially served is set, the dish is preferentially delivered to the person with the set attribute. Processing of changing a serving direction is performed in accordance with the dominant hand of the target.

A series of processing corresponding to the use case as described above is described later with reference to a flowchart.

<Configuration and Operation of Conveyance Robot>

Configuration of Conveyance Robot

Figure 21:
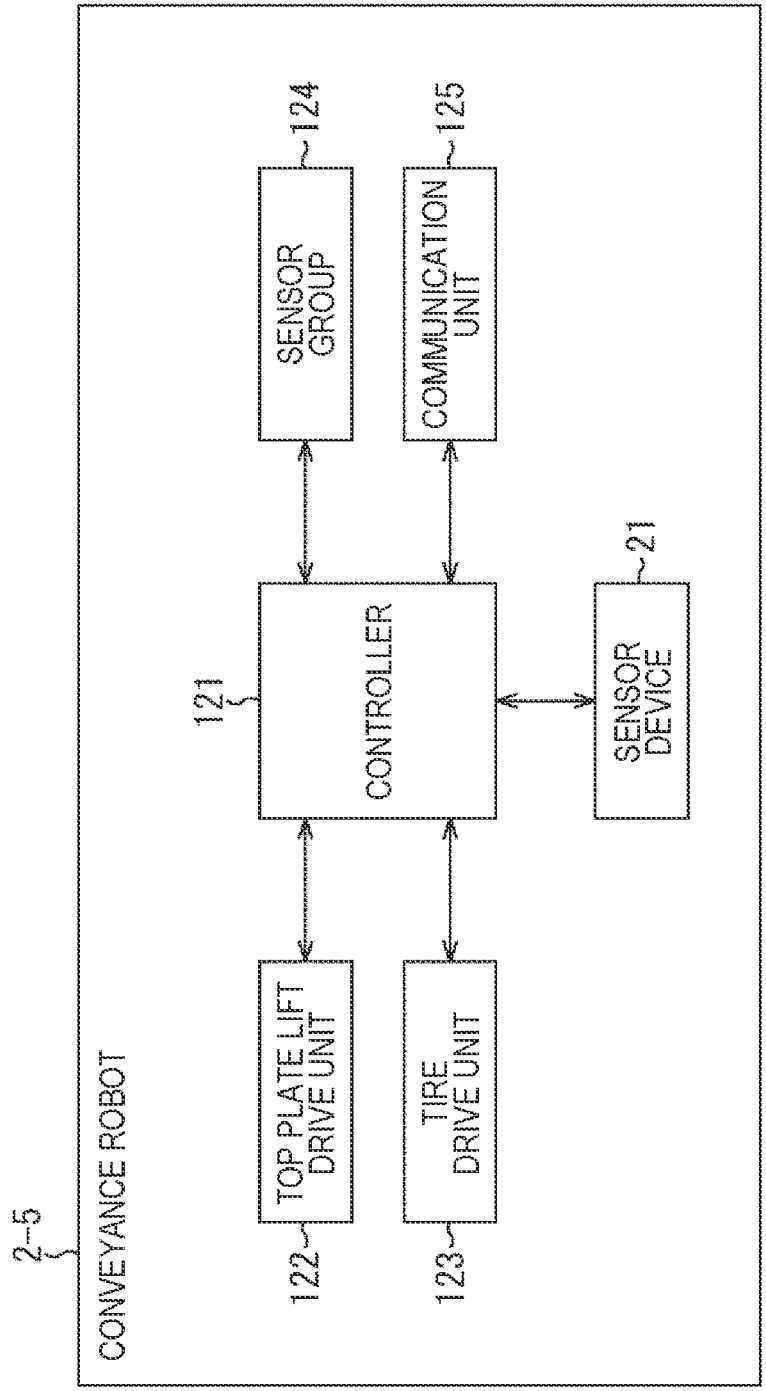
FIG. 21 is a block diagram illustrating a configuration example of hardware of the conveyance robot.

FIG. 21 is a block diagram illustrating a configuration example of hardware of the conveyance robot 2-5.

The conveyance robot 2-5 is formed by connecting a top plate lift drive unit 122, a tire drive unit 123, a sensor group 124, and a communication unit 125 to a controller 121. The sensor device 21 is also connected to the controller 121.

The controller 121 includes a CPU, a ROM, a RAM, a flash memory and the like. The controller 121 executes a predetermined program and controls an entire operation of the conveyance robot 2-5 including the sensor device 21. The controller 121 corresponds to the controller 51 on the host side (FIG. 13).

The top plate lift drive unit 122 includes a motor and the like provided on the connection between the base 101 and the support arm 103, the connection between the top plate 102 and the support arm 103 and the like. The top plate lift drive unit 122 drives the respective connections.

Furthermore, the top plate lift drive unit 122 includes a rail or a motor provided inside the support arm 103. The top plate lift drive unit 122 extends and contracts the support arm 103.

The tire drive unit 123 includes a motor that drives the tires provided on the bottom surface of the base 101.

The sensor group 124 includes various sensors such as a positioning sensor, a gyro sensor, an acceleration sensor, a temperature sensor, and an illuminance sensor. Sensor data indicating a detection result by the sensor group 124 is output to the controller 121.

The communication unit 125 is a wireless communication module such as a wireless LAN module or a mobile communication module. The communication unit 125 communicates with an external device such as the program management server 1.

Figure 22:
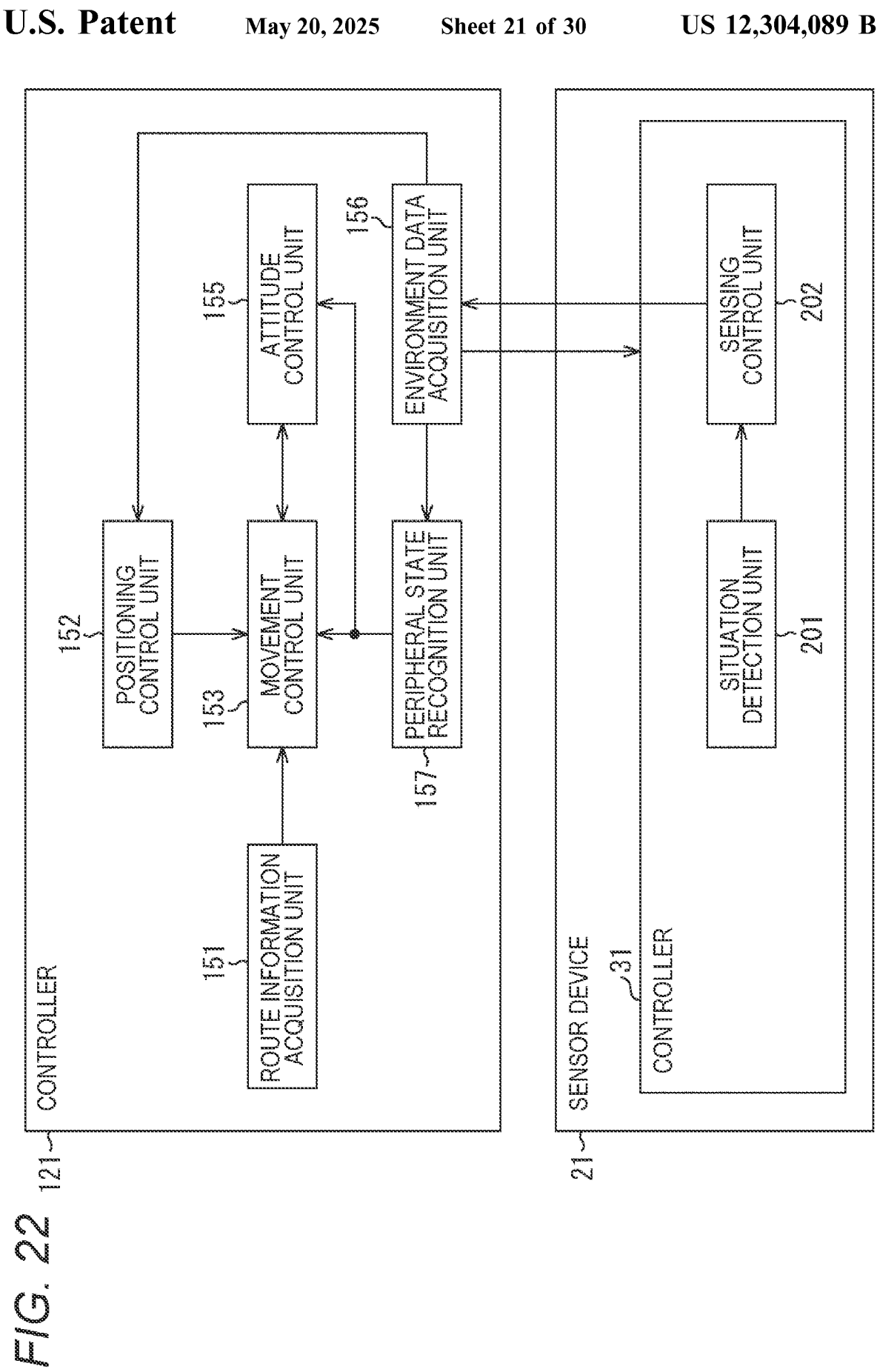
FIG. 22 is a block diagram illustrating a functional configuration example of the conveyance robot.

FIG. 22 is a block diagram illustrating a functional configuration example of the conveyance robot 2-5.

At least a part of functional units illustrated in FIG. 22 is implemented by executing a predetermined program by the CPU forming the controller 121 and the CPU forming the controller 31 of the sensor device 21.

In the controller 121, a route information acquisition unit 151, a positioning control unit 152, a movement control unit 153, an attitude control unit 155, an environment data acquisition unit 156, and a peripheral state recognition unit 157 are implemented.

In contrast, in the controller 31 of the sensor device 21, a situation detection unit 201 and a sensing control unit 202 are implemented. The sensor device 21 is a data processing device that controls the sensing algorithm.

The route information acquisition unit 151 of the controller 121 controls the communication unit 125 and receives information of a destination and a moving route transmitted from a control device not illustrated. The information received by the route information acquisition unit 151 is output to the movement control unit 153.

The route information acquisition unit 151 may plan the moving route on the basis of the destination and a current position of the conveyance robot 2-5 at a timing when the conveyance object is prepared and the like.

In this case, the route information acquisition unit 151 serves as an operation plan setting unit that plans the operation of the conveyance robot 2-5 and sets an operation plan.

The positioning control unit 152 detects the current position of the conveyance robot 2-5. For example, the positioning control unit 152 generates a ma of a space in which the cooking robot 2-4 is installed on the basis of a detection result by a distance sensor forming the sensor device 21. Sensor data, which is an output of the sensor device 21, is acquired by the environment data acquisition unit 156 and supplied to the positioning control unit 152.

The positioning control unit 152 detects the current position by specifying its own position on the generated map. Information on the current position detected by the positioning control unit 152 is output to the movement control unit 153. The detection of the current position by the positioning control unit 152 may be performed on the basis of an output of the positioning sensors forming the sensor group 124. The current position of the conveyance robot 2-5 may be detected by the sensor device 21.

The movement control unit 153 controls the tire drive unit 123 to control the movement of the conveyance robot 2-5 on the basis of the information supplied from the route information acquisition unit 151 and the current position detected by the positioning control unit 152.

Furthermore, the movement control unit 153 controls the movement so as to avoid an obstacle in a case where information regarding the obstacle around the same is supplied from the peripheral state recognition unit 157. The obstacle includes various moving objects and stationary objects such as people, furniture, and home appliances. In this manner, the movement control unit 153 controls the movement of the conveyance robot 2-5 accompanying the conveyance of the conveyance object on the basis of the result of the human sensing by the sensor device 21.

The attitude control unit 155 controls the top plate lift drive unit 122 to control the attitude of the conveyance robot 2-5. Furthermore, in conjunction with the control by the movement control unit 153, the attitude control unit 155 controls the attitude of the conveyance robot 2-5 during the movement so as to keep the top plate 102 horizontal.

The attitude control unit 155 controls the attitude of the conveyance robot 2-5 according to the peripheral state recognized by the peripheral state recognition unit 157. For example, the attitude control unit 155 controls the attitude of the conveyance robot 2-5 so that the height of the top plate 102 approaches the height of the top plate of the cooking robot 2-4 or a height of a top plate of a dining table recognized by the peripheral state recognition unit 157.

The environment data acquisition unit 156 controls the sensor device 21 to perform the human sensing and acquires the sensor data indicating the result of the human sensing. The sensor data acquired by the environment data acquisition unit 156 is supplied to the positioning control unit 152 and the peripheral state recognition unit 157.

The peripheral state recognition unit 157 recognizes the peripheral state on the basis of the sensor data indicating the result of the human sensing supplied from the environment data acquisition unit 156. Information indicating a recognition result by the peripheral state recognition unit 157 is supplied to the movement control unit 153 and the attitude control unit 155.

In a case where detection of the obstacle, measurement of a distance to the obstacle, estimation of a direction of the obstacle, estimation of a self-position and the like are performed by the sensor device 21, the peripheral state recognition unit 157 outputs the information regarding the obstacle as information indicating the recognition result of the peripheral state.

The detection of the obstacle, the measurement of the distance to the obstacle, the estimation of the direction of the obstacle, the estimation of the self-position and the like may be performed by the peripheral state recognition unit 157 on the basis of a sensing result by the sensor device 21. In this case, the sensor data used for each processing performed by the peripheral state recognition unit 157 is detected by the sensor device 21.

In this manner, contents of the processing performed by the sensor device 21 are arbitrary. That is, raw data detected by the sensor provided on the sensor device 21 may be directly supplied to the controller 121 as the sensor data, or processing and analysis of the raw data may be performed on the sensor device 21 side, and a result of the processing and analysis may be supplied to the controller 121 as the sensor data.

The situation detection unit 201 on the sensor device 21 side detects the situation of the conveyance robot 2-5. The situation of the conveyance robot 2-5 is detected on the basis of, for example, the sensor data output from the sensor forming the sensor group 124 or the sensor data output from the sensor provided on the sensor device 21.

The situation of the conveyance robot 2-5 includes, for example, the operation of the conveyance robot 2-5 such as the operation performed by the same, the place where the conveyance robot 2-5 is located, the weather, temperature, humidity, and brightness in the place where the conveyance robot 2-5 is located. Furthermore, the situation of the conveyance robot 2-5 also includes an external situation such as a situation of a person with whom the conveyance robot 2-5 is communicating and a situation of the obstacle around the conveyance robot 2-5.

The situation detection unit 201 outputs information indicating such situation of the conveyance robot 2-5 to the sensing control unit 202.

The sensing control unit 202 selects the sensing algorithm according to the human sensing condition to perform the human sensing in the situation detected by the situation detection unit 201, and executes the sensing program that defines the selected sensing algorithm.

For example, the sensing algorithm or the sensing program is associated with each human sensing condition. The sensing control unit 202 selects the sensing algorithm or the sensing program corresponding to the human sensing condition using the ID as the identification data. The sensing program set may be selected according to the human sensing condition.

The sensing control unit 202 drives each sensor provided on the sensor device 21 by executing the sensing program, and performs the human sensing on the basis of the output of each sensor. The sensing control unit 202 outputs the sensor data indicating the result of the human sensing to the controller 121. The sensing control unit 202 appropriately outputs various types of sensor data other than the result of the human sensing.

Operation of Conveyance Robot

The processing of the conveyance robot 2-5 is described with reference to a flowchart in FIG. 23.

At step S1, the sensing control unit 202 performs accuracy selection processing. By the accuracy selection processing, the sensing algorithm for securing accuracy of the human sensing is selected. The accuracy selection processing is described later in detail with reference to a flowchart in FIG. 24.

At step S2, the sensing control unit 202 performs human sensing processing. The human sensing processing is the processing corresponding to the use case as described above. The human sensing processing is described later in detail with reference to flowchart in FIG. 27.

Figure 23:
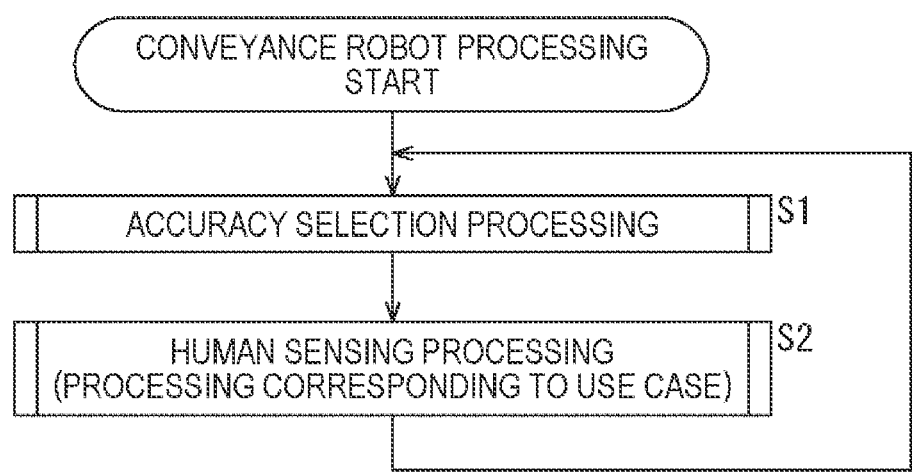
FIG. 23 is a flowchart for explaining processing of the conveyance robot.

Next, the accuracy selection processing performed at step S1 in FIG. 23 is described with reference to the flowchart in FIG. 24.

At step S11, the situation detection unit 201 detects the place of the conveyance robot 2-5 on the basis of the sensor data from the sensor group 124 or the sensor data output by each sensor forming the sensor device 21. The situation of the conveyance robot 2-5 may be detected using both the sensor data from the sensor group 124 and the sensor data output from each sensor forming the sensor device 21.

At step S12, the sensing control unit 202 determines whether or not the conveyance robot 2-5 is located indoors on the basis of a detection result by the situation detection unit 201.

In a case where it is determined at step S12 that the conveyance robot 2-5 is located indoors, the sensing control unit 202 selects an indoor basic algorithm and performs the human sensing at step S13.

The indoor basic algorithm is the sensing algorithm to adjust imaging parameters of the RGB camera 32A such as a shutter speed and sensitivity according to intensity of ambient light and perform the human sensing. The shutter speed is set to a standard to lower speed, and the sensitivity is set to standard to higher sensitivity.

At step S14, the sensing control unit 202 performs indoor processing. In the indoor processing, the sensing algorithm is selected according to an indoor situation, and the human sensing is performed. The sensing algorithm used for the human sensing is appropriately switched from the indoor basic algorithm to another sensing algorithm. The indoor processing is described later in detail with reference to a flowchart in FIG. 25.

In contrast, in a case where it is determined at step S12 that the conveyance robot 2-5 is not located indoors, that is, located outdoors, the sensing control unit 202 selects an outdoor basic algorithm and performs the human sensing at step S15.

The outdoor basic algorithm is the sensing algorithm to adjust imaging parameters of the RGB camera 32A such as a shutter speed and sensitivity according to intensity of ambient light and perform the human sensing. The shutter speed is set to a standard to higher speed, and the sensitivity is set to standard to lower sensitivity.

At step S16, the sensing control unit 202 performs outdoor processing. In the outdoor processing, the sensing algorithm is selected according to an outdoor situation, and the human sensing is performed. The sensing algorithm used for the human sensing is appropriately switched from the outdoor basic algorithm to another sensing algorithm. The outdoor processing is described later in detail with reference to a flowchart in FIG. 26.

After the indoor processing is performed at step S14 or after the outdoor processing is performed at step S16, the procedure returns to step S1 in FIG. 23, and the subsequent processing is repeated.

Figure 24:
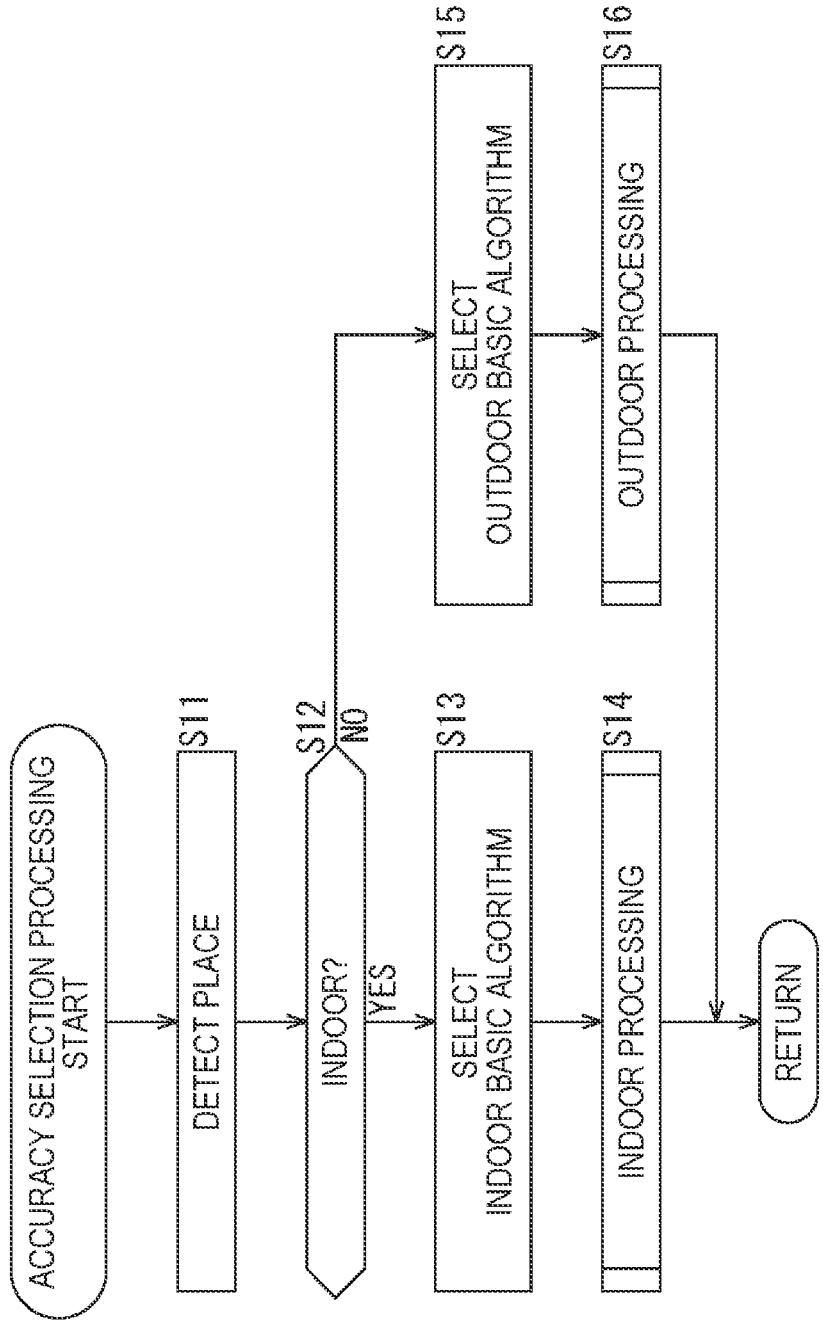
FIG. 24 is a flowchart for explaining accuracy selection processing performed at step S1 in FIG. 23.
Figure 25:
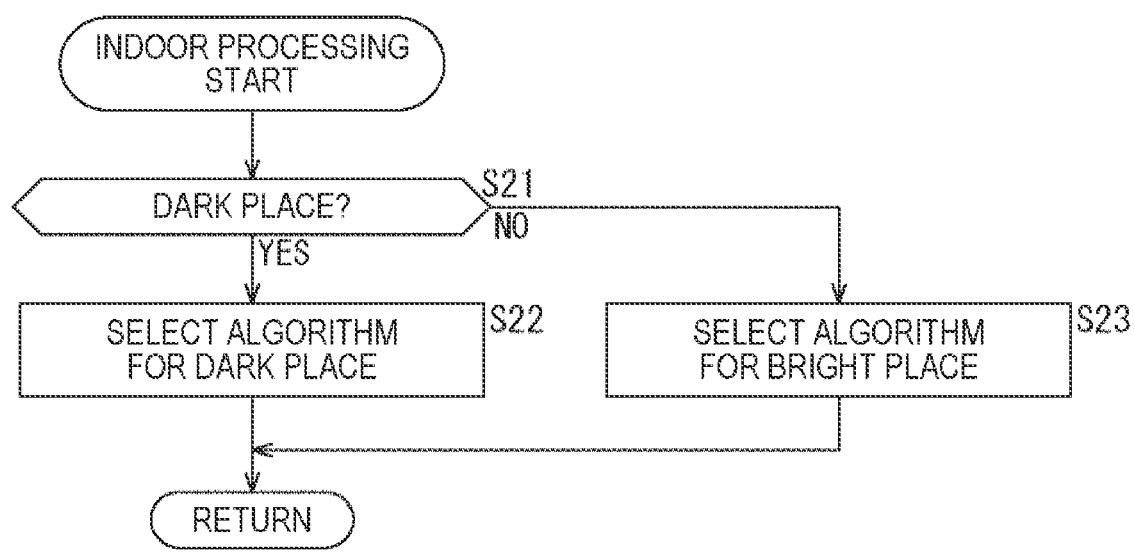
FIG. 25 is a flowchart for explaining indoor processing performed at step S14 in FIG. 24.

Next, the indoor processing performed at step S14 in FIG. 24 is described with reference to the flowchart in FIG. 25.

At step S21, the sensing control unit 202 determines whether or not the conveyance robot 2-5 is located in a dark place on the basis of the detection result by the situation detection unit 201.

In a case where it is determined at step S21 that the conveyance robot 2-5 is located in the dark place, at step S22, the sensing control unit 202 selects the algorithm for dark place according to the human sensing condition to perform the human sensing in the dark place, and performs the human sensing. The algorithm for dark place is, for example, the sensing algorithm to image the RGB image while setting the sensitivity of the RGB camera 32A to be higher than the standard sensitivity, and perform the human sensing on the basis of the RGB image acquired by the imaging.

In a case where it is determined at step S21 that the conveyance robot 2-5 is not located in the dark place, at step S23, the sensing control unit 202 selects an algorithm for bright place according to the human sensing condition to perform the human sensing in a bright place, and performs the human sensing. The algorithm for bright place is, for example, the sensing algorithm to image the RGB image while setting the sensitivity of the RGB camera 32A to be lower than the standard sensitivity, and perform the human sensing on the basis of the RGB image acquired by the imaging.

After the human sensing is performed using the sensing algorithm selected according to the place of the conveyance robot 2-5, the procedure returns to step S14 in FIG. 24, and the subsequent processing is performed.

Figure 26:
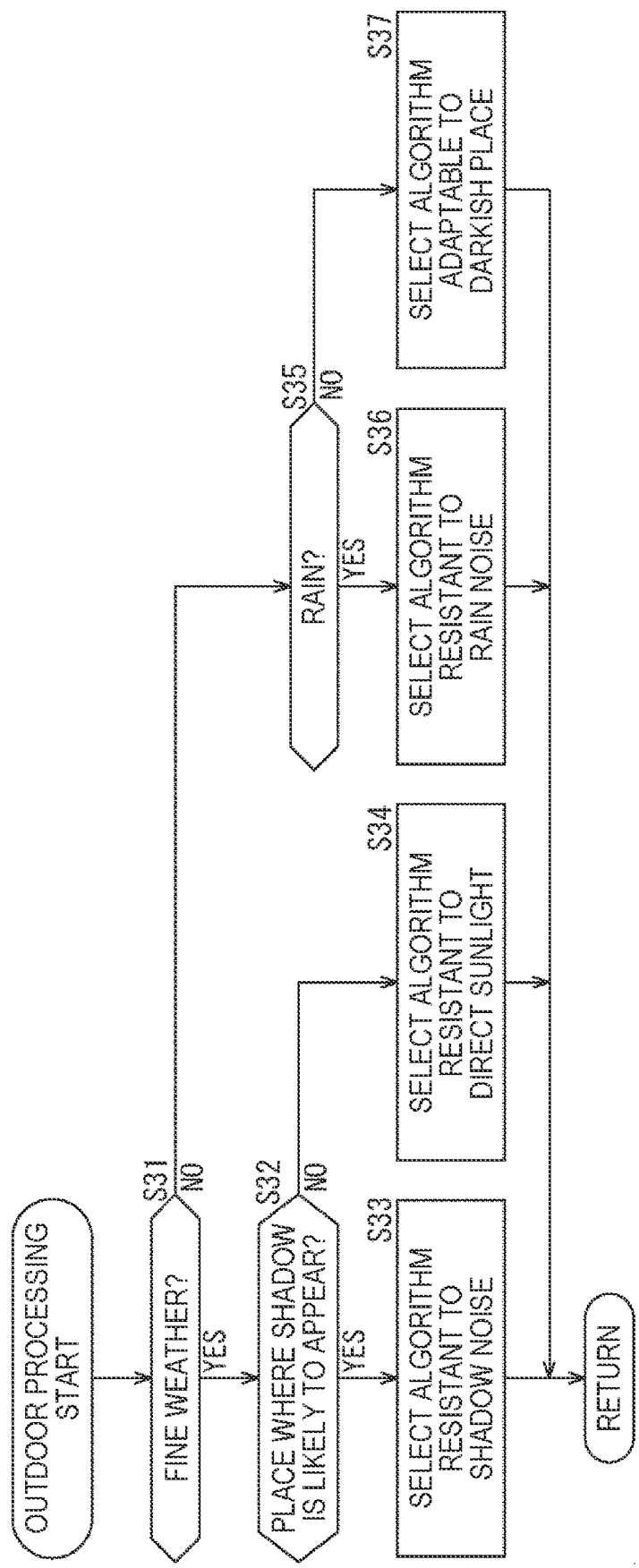
FIG. 26 is a flowchart for explaining outdoor processing performed at step S16 in FIG. 24.

Next, the outdoor processing performed at step S16 in FIG. 24 is described with reference to the flowchart in FIG. 26.

At step S31, the sensing control unit 202 determines whether or not the weather in the place where the conveyance robot 2-5 is located is fine. It is determined whether or not the weather is fine on the basis of the detection result of the situation by the situation detect on unit 201.

In a case where it is determined at step S31 that the weather in the place of the conveyance robot 2-5 is fine, at step S32, the sensing control unit 202 determines whether or not this is a place where a shadow is likely to appear.

In a case where it is determined at step S32 that the place is the place where the shadow is likely to appear, at step S33, the sensing control unit 202 selects an algorithm resistant to a shadow noise according to the human sensing condition to perform the human sensing in the place where the shadow is likely to appear. The sensing algorithm selected here is the sensing algorithm to image while adjusting the imaging parameters of the RGB camera 32A so as to extend a dynamic range of luminance, and perform the human sensing on the basis of the RGB image acquired by the imaging.

After the sensing algorithm is selected, the sensing program that defines the selected sensing algorithm is executed, and the human sensing is performed. The same applies to a case where another sensing algorithm is selected.

In a case where it is determined at step S32 that the place is not the place where the shadow is likely to appear, at step S34, the sensing control unit 202 selects an algorithm resistant to direct sunlight according to the human sensing condition to perform the human sensing under the direct sunlight. The sensing algorithm selected here is the sensing algorithm to image while adjusting the imaging parameters of the RGB camera 32A so as to increase the shutter speed and decrease the sensitivity, and perform the human sensing on the basis of the RGB image acquired by the imaging.

In contrast, in a case where it is determined at step S31 that the weather is not fine, the procedure shifts to step S35.

At step S35, the sensing control unit 202 determines whether or not it is raining. It is determined whether or not it is raining on the basis of the detection result of the situation by the situation detection unit 201.

In a case where it is determined at step S35 that it is raining, at step S36, the sensing control unit 202 selects an algorithm resistant to a rain noise according to the human sensing condition to perform the human sensing in a place where it is raining. The sensing algorithm selected here is the sensing algorithm to perform image processing to remove noise on the RGB image imaged by the RGB camera 32A, and then perform the human sensing on the basis of the RGB image acquired after the noise removal.

A known technology is used for the noise removal. The technology for noise removal is disclosed in, for example, "https://digibibo.com/blog-entry-3422.html, and http://www.robot.t.u-tokyo.ac.jp/~yamashita/paper/A/A025Final.pdf".

In a case where it is determined at step S35 that it is not raining, at step S37, the sensing control unit 202 selects an algorithm adaptable to a darkish place according to the human sensing condition to perform the human sensing in a darkish place. The sensing algorithm selected here is the sensing algorithm to image while adjusting the imaging parameters of the RGB camera 32A so as to decrease the shutter speed and increase the sensitivity, and perform the human sensing on the basis of the RGB image acquired by the imaging.

After the human sensing is performed using the sensing algorithm selected according to the place of the conveyance robot 2-5, the procedure returns to step S16 in FIG. 24, and the subsequent processing is performed.

Figure 27:
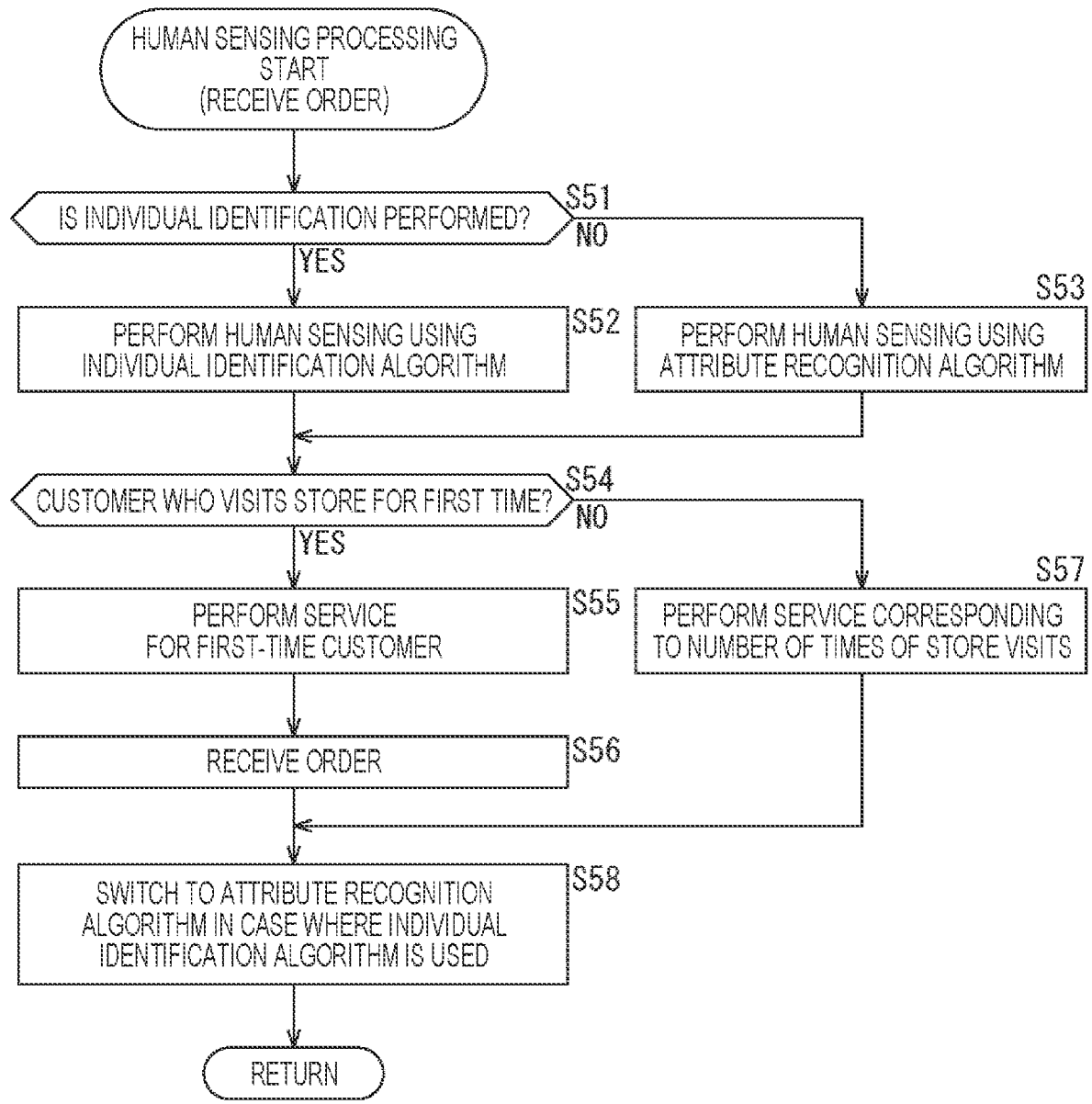
FIG. 27 is a flowchart for explaining human sensing processing performed at step S2 in FIG. 23.

Next, the human sensing processing performed at step S2 in FIG. 23 is described with reference to the flowchart in FIG. 27.

Here, as described as the use case 2, the processing of the conveyance robot 2-5 that receives the order is described. The processing in FIG. 27 is performed, for example, after the conveyance robot 2-5 moves to the vicinity of the target from whom the order is received.

At step S51, the sensing control unit 202 determines whether or not to perform individual identification when receiving the order.

In a case where it is determined at step S51 to perform the individual identification, at step S52, the sensing control unit 202 performs the human sensing using the individual identification algorithm according to the human sensing condition to perform the individual identification.

In a case where it is determined at step S51 not to perform the individual identification, at step S53, the sensing control unit 202 performs the human sensing using the attribute recognition algorithm according to the human sensing condition to perform the attribute recognition.

After the human sensing is performed using the algorithm selected according to whether or not to perform the individual identification, the procedure shifts to step S54.

At step S54, the controller 121 (for example, the peripheral state recognition unit 157) determines whether or not a person specified by the human sensing is a customer who visits the store for the first time on the basis of the result of the human sensing.

In a case where it is determined at step S54 that the customer is the customer who visits the store for the first time, the controller 121 performs a service for a first-time customer at step S55.

At step S56, the controller 121 receives the order on the basis of the individual identification result or the attribute recognition result. For example, in a case where the person specified by the human sensing is a woman, it is confirmed whether or not an amount is reduced.

In contrast, in a case where it is determined at step S54 that the customer is not the customer who visits the store for the first time, at step S57, the controller 121 performs a service corresponding to the number of times of store visits. After the customer service is performed at step S56 or step S57, the procedure shifts to step S58.

At step S58, in a case where the individual identification algorithm is used, the sensing control unit 202 switches the sensing algorithm used for the human sensing to the attribute recognition algorithm. Thereafter, the procedure returns to step S2 in FIG. 23 and the above-described processing is repeated.

Figure 28:
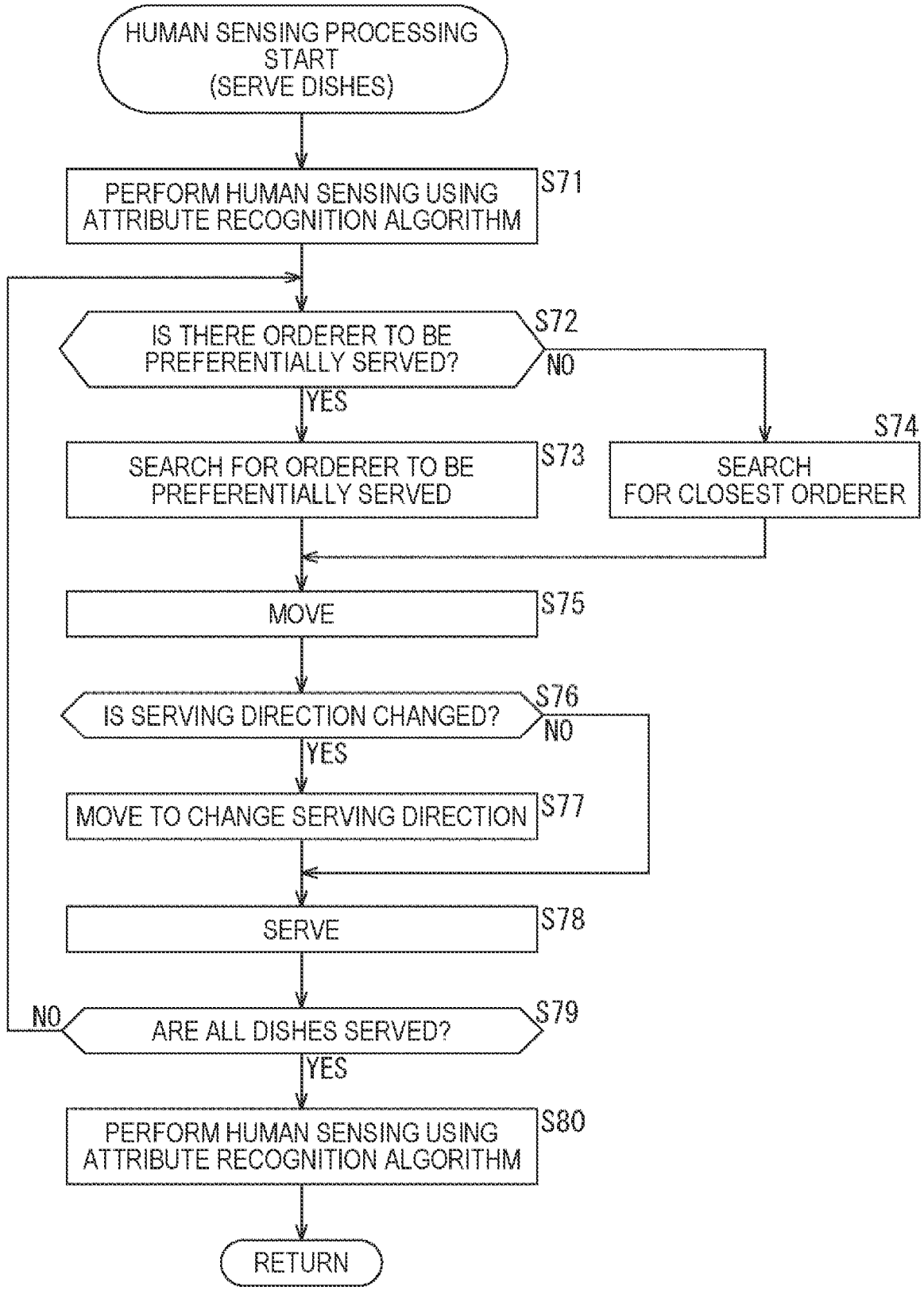
FIG. 28 is a flowchart for explaining the human sensing processing performed at step S2 in FIG. 23.

Next, another human sensing processing performed at step S2 in FIG. 23 is described with reference to a flowchart in FIG. 28.

Here, as described as the use case 3, the processing of the conveyance robot 2-5 that serves the dish is described. The processing in FIG. 28 is performed, for example, after the conveyance robot 2-5 moves to the vicinity of the target (orderer) to whom the dish is served.

At step S71, the sensing control unit 202 of the sensor device 21 performs the human sensing using the attribute recognition algorithm according to the human sensing condition to perform the attribute recognition.

At step S72, the controller 121 determines whether or not there is the orderer to be preferentially served on the basis of the result of the human sensing by the sensor device 21.

In a case where it is determined at step S72 that there is the orderer to be preferentially served, at step S73, the sensing control unit 202 searches for the orderer to be preferentially served.

In contrast, in a case where it is determined at step S72 that there is no orderer to be preferentially served, at step S74, the sensing control unit 202 searches for the nearest orderer.

After the order searched for at step S73 or step S74, the procedure shifts to step S75.

At step S75, the controller 121 (for example, the movement control unit 153) moves on the basis of the result of the human sensing by the sensor device 21. For example, the conveyance robot 2-5 is moved so as to approach the orderer found by the search.

At step S76, the controller 121 determines whether or not the serving direction is changed on the basis of the result of the human sensing by the sensor device 21. For example, in a case where the conveyance robot 2-5 is located in a position on a side of the hand opposite to the dominant hand of the orderer, it is determined that the serving direction is changed. In contrast, in a case where the conveyance robot 2-5 is located in a position on a side of the dominant hand of the orderer, it is determined that the serving direction is not changed.

In a case where it is determined at step S76 that the serving direction is changed, the controller 121 moves the conveyance robot 2-5 to change the serving direction at step S77. In a case where it is determined at step S76 that the serving direction is not changed, the processing at step S77 is skipped.

At step S78, the attitude control unit 155, for example, of the controller 121 controls the attitude of the conveyance robot 2-5, adjusts the height of the top plate 102 to the height of the table used by the customer, and serves the dish to the orderer.

At step S79, the sensing control unit 202 determines whether or not all the dishes are served.

In a case where it is determined at step S79 that there is the dish not yet served, the procedure returns to step S72, and the above-described processing is repeated.

In contrast, in a case where it is determined at step S79 that all the dishes are served, at step S80, the sensing control unit 202 performs the human sensing using the attribute recognition algorithm. Thereafter, the procedure returns to step S2 in FIG. 23, and the above-described processing is repeated.

By the above-described processing, the conveyance robot 2-5 may select the sensing algorithm according to the situation such as the place where this is located and perform the human sensing. Furthermore, the conveyance robot 2-5 may control various operations such as the serving on the basis of the result of the human sensing performed using the sensing algorithm selected according to the situation.

<Other Use Cases>

Other use cases of the human sensing by the conveyance robot 2-5 are described.

Use Case 4

A use case 4 is the use case of serving a drink.

In the use case 4, the attribute of the customer is recognized using the attribute recognition algorithm A2. On the basis of the attribute recognition result, for example, processing of determining a kind of the drink to be served is performed by the conveyance robot 2-5. For example, in a case where the attribute of the person to be served is a child, a drink other than alcoholic drinks is served.

Use Case 5

A use case 5 is the use case where confectionery such as gum and candy is provided according to an ordered dish.

In the use case 5, the attribute of the customer is recognized using the attribute recognition algorithm A2. On the basis of the attribute recognition result, for example, the conveyance robot 2-5 performs processing of managing the attribute of the orderer and the dish ordered by this person in association with each other. In a case where there is a person who leaves the store after finishing the meal, confectionary is provided according to the ordered dish.

Although the use cases of the human sensing by the conveyance robot 2-5 are described above, various use cases are similarly assumed for the human sensing by other devices.

Here, use cases of the human sensing by the cooking robot 2-4 are described.

Use Case 6

A use case 6 is the use case when arranging ingredients. In the use case 6, there are a case of using the individual identification algorithm A1 and a case of using the attribute recognition algorithm A2.

Note that, the arrangement of the ingredients by the cooking robot 2-4 is performed by driving the cooking arm to arrange the cooked ingredient in a predetermined position of tableware. On the basis of a result of the object sensing by the sensor device 21 and the like, a position of the cooked ingredient, a position of the tableware and the like are recognized, and the arrangement is performed.

In the case of using the attribute recognition algorithm A2, the attribute of the person who orders the dish being arranged is recognized using the attribute recognition algorithm A2.

An arranging manner is changed on the basis of the attribute recognition result: for example, in a case where the ordered target is a woman, feminine tableware is used, and in a case where the target is a child, arrangement for children is performed.

In the case of using the individual identification algorithm A1, it is recognized who the target is together with the attribute using the individual identification algorithm A1.

On the basis of the individual identification result, for example, the cooking robot 2-4 performs processing of changing the arranging manner or changing the ingredient to be used according to the preference of this person.

Use Case 7

A use case 7 is the use case when determining a menu. The cooking by the cooking robot 2-4 is performed according to cooking data corresponding to the menu. The cooking data includes information defining the contents and order of the cooking operations of the cooking arm in each cooking process until the dish is completed.

In the use case 7, it is recognized who the target is together with the attribute using the individual identification algorithm A1.

For example, a history of meal contents of the target is specified on the basis of the individual identification result, and the menu in consideration of nutritional balance is determined.

Use Case 8

A use case 8 is the use case when cooking at home. In the use case 8, it is recognized who the target is together with the attribute using the individual identification algorithm A1.

For example, in a case where it is specified that there is only family members on the basis of the individual identification result, the cooking is performed using the older ingredients first. Furthermore, processing of changing cooking contents (strength of taste, degree of roasting, degree of boiling and the like) is performed according to a health condition of the family members.

Use Case 9

A use case 9 is the use case when washing hands. A groove for washing hands is prepared in a predetermined position of the top plate of the cooking robot 2-4. The groove is provided with a configuration for spraying water or a washing liquid toward the hands.

In the use case 9, there are a case of using the individual identification algorithm A1 and a case of using the attribute recognition algorithm A1.

In the case of using the attribute recognition algorithm A2, the attribute of a person who washes hands is recognized using the attribute recognition algorithm A2.

On the basis of the attribute recognition result, for example, in a case where the person who washes hands is a woman or a child, the hands are washed with water with suppressed strength.

In the case of using the individual identification algorithm A1, it is recognized who the target is together with the attribute using the individual identification algorithm A1.

On the basis of the individual identification result, for example, strength of cleaning and a type of cleaning liquid are changed according to preference of this person.

Use Case 10

A use case 10 is the use case when the cooking robot 2-4 is used. In the use case 10, the attribute of the target is recognized using the attribute recognition algorithm A2.

On the basis of the attribute recognition result, for example, control so as to prevent usage by a child is performed by the cooking robot 2-4.

<Variation>

Application Example to Other Systems

Figure 29:
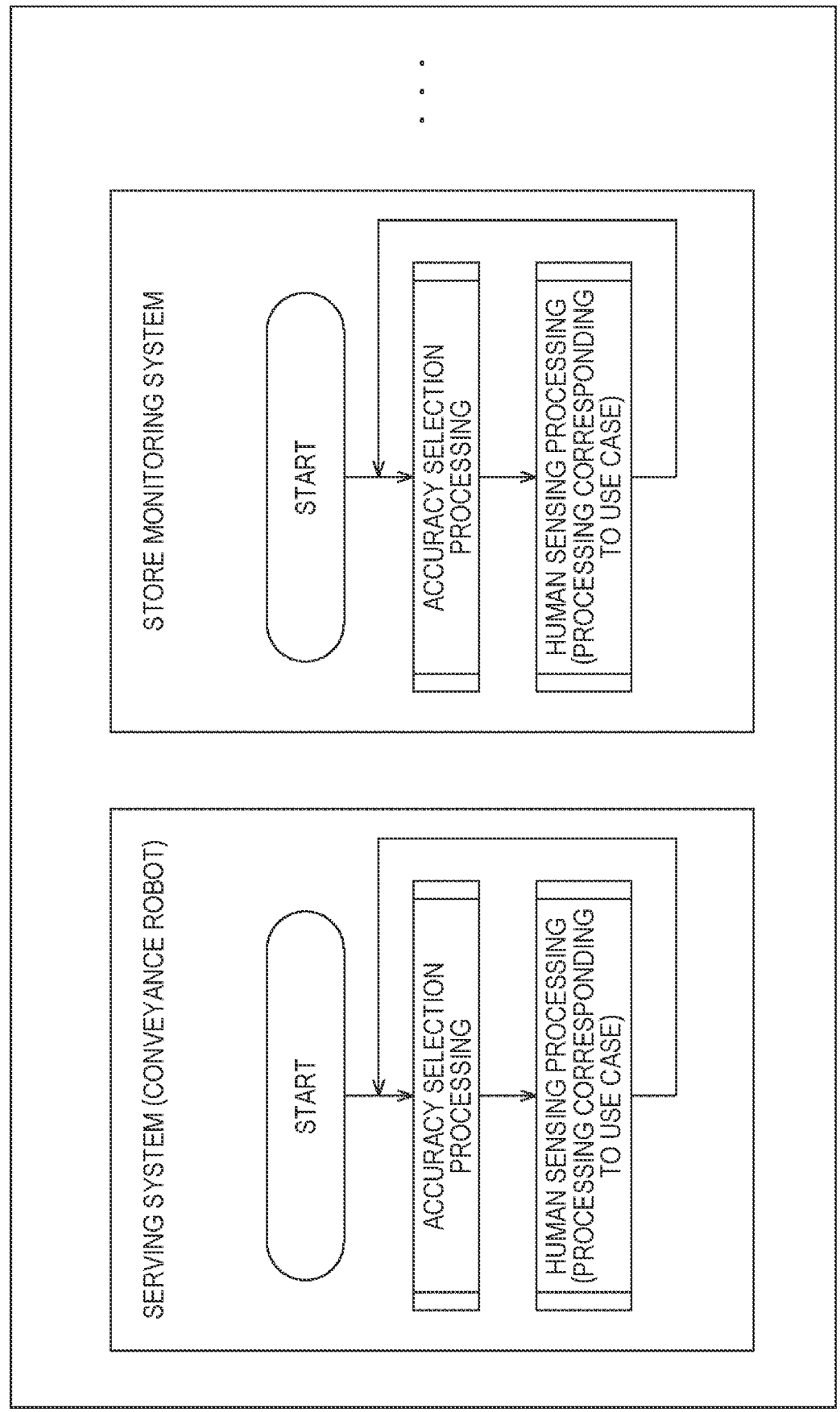
FIG. 29 is a view illustrating an application example of the human sensing.

FIG. 29 is a view illustrating an application example of the human sensing.

In a case where the human sensing is performed is each of a plurality of systems provided in one store, the human sensing corresponding to the use case is defined for each system as illustrated in FIG. 29.

A serving system illustrated in FIG. 29 is the system including the conveyance robot 2-5. In the serving system, the human sensing corresponding to the use case is performed by the processing described with reference to FIG. 23.

A store monitoring system illustrated in FIG. 29 is the system that uses the sensor device 21 as a monitoring camera. The sensor device 21 is attached to each position in the store. In the store monitoring system also, the human sensing corresponding to the use case is performed by processing similar to the processing described with reference to FIG. 23.

Example of Case where Sensing Algorithm is Externally Selected

The selection of the sensing algorithm corresponding to the human sensing condition is performed in the sensor device 21, but this may be performed by a device outside the device on which the sensor device 21 is mounted.

Figure 30:
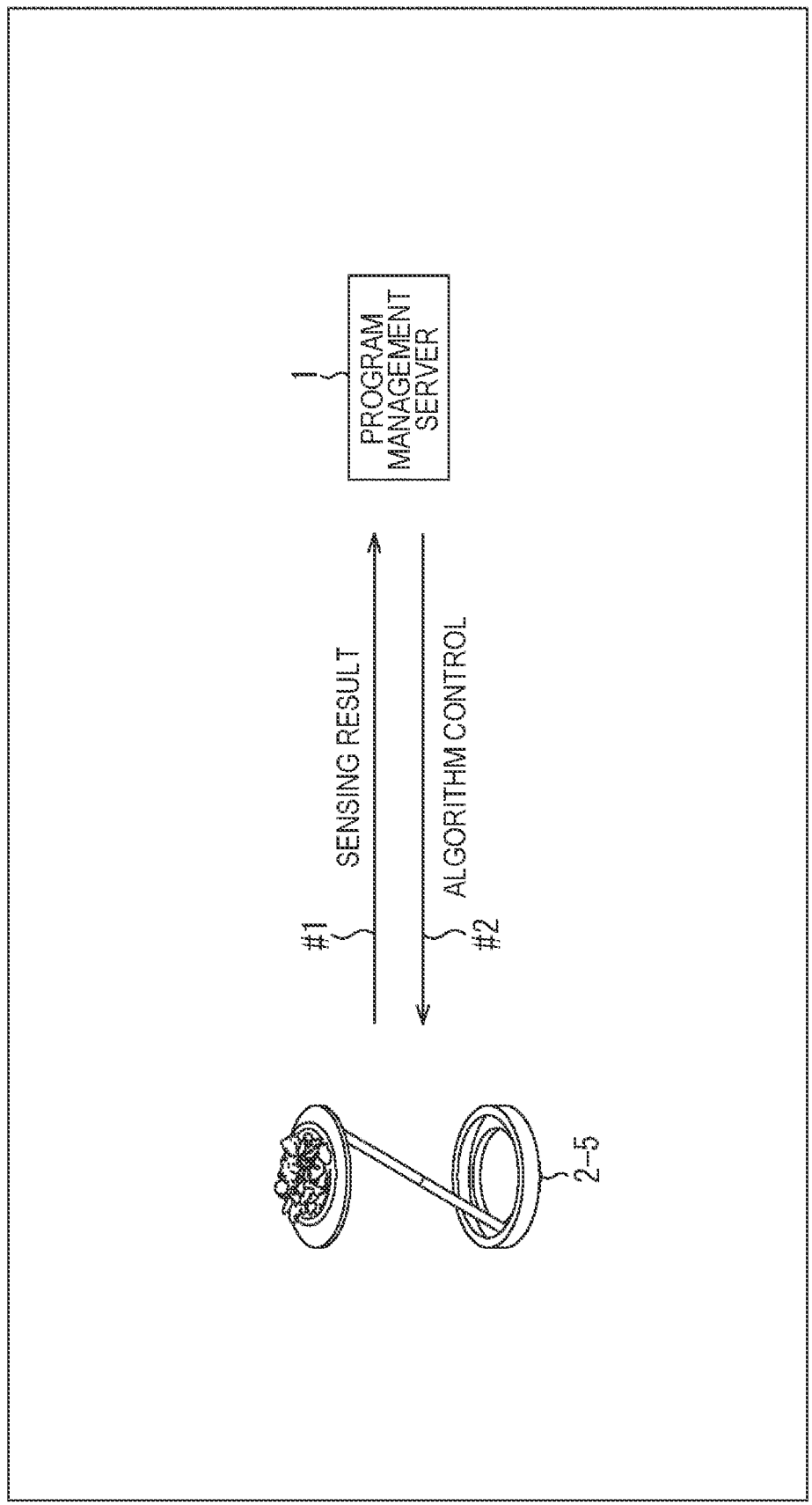
FIG. 30 is a view illustrating an example of control of a sensing algorithm.

FIG. 30 is a view illustrating an example of control of the sensing algorithm.

In the example in FIG. 30, the selection of the sensing algorithm corresponding to the sensing condition is performed by the program management server 1, which is the external device. In this case, the configuration of the controller 31 in FIG. 22 is implemented in the program management server 1. The program management server 1 is a data processing device that controls the sensing program executed by the sensor device 21 mounted on the conveyance robot 2-5.

As indicated by an arrow #1, sensor data used for detecting a situation is transmitted from the conveyance robot 2-5 to the program management server 1, and execution of the sensing program is requested.

The situation detection unit 201 of the program management server 1 detects the situation of the conveyance robot 2-5 on the basis of the sensor data transmitted from the conveyance robot 2-5. Furthermore, the human sensing condition corresponding to the situation of the conveyance robot 2-5 is determined by the sensing control unit 202, and the sensing algorithm is selected.

The sensing control unit 202 of the program management server 1 transmits the sensing program that defines the sensing algorithm corresponding to the human sensing condition to the sensor device 21 mounted on the conveyance robot 2-5, and causes the same to execute the sensing program.

In this manner, the sensing algorithm may be controlled by a device outside the sensor device 21. For example, the controller 121 of the conveyance robot 2-5 on which the sensor device 21 is mounted may be made an external device, and the sensing algorithm may be controlled by the controller 121.

The sensing program that defines the sensing algorithm corresponding to the human sensing condition may be executed by the program management server 1 or the controller 121, which is the external device, and information indicating an execution result may be transmitted to the sensor device 21.

Figure 31:
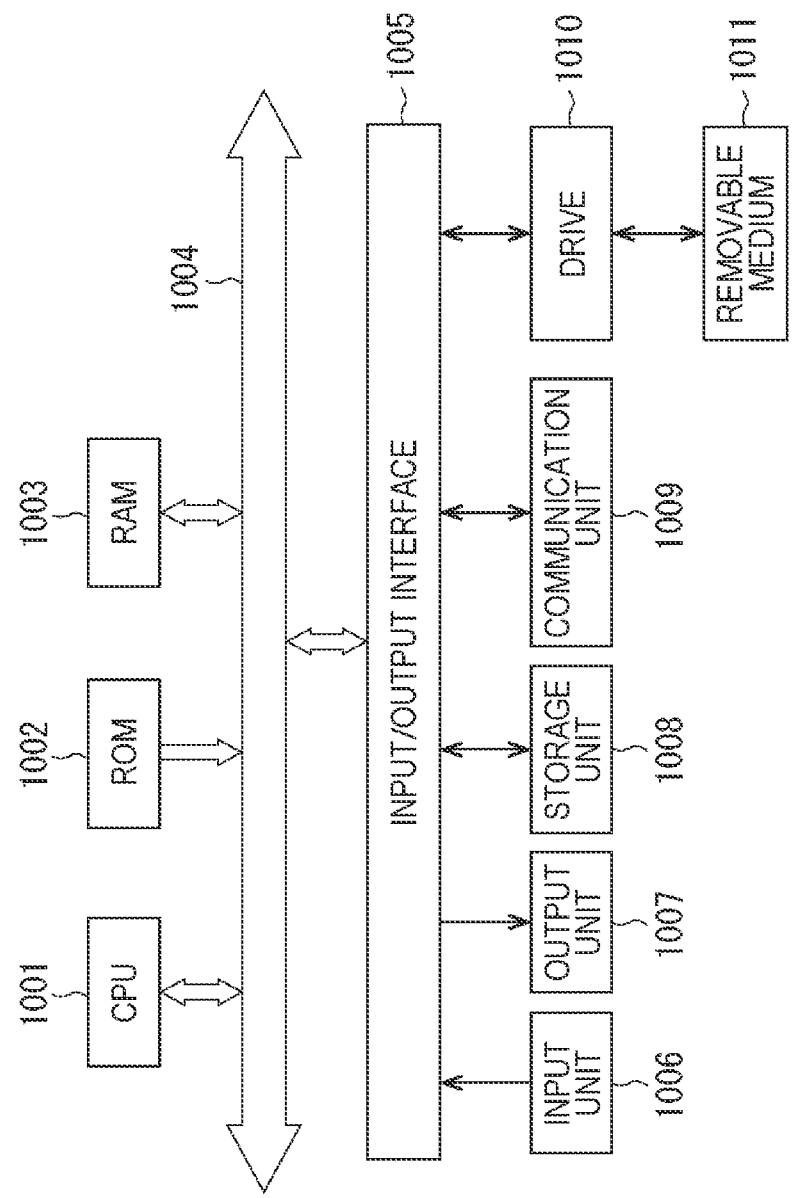
FIG. 31 is a block diagram illustrating a configuration example of hardware of a computer that implements a program management server.

FIG. 31 is a block diagram illustrating a configuration example of hardware of a computer that implements the program management server 1.

A central processing unit (CPU) 1001, a read only memory (ROM) 1002, and a random access memory (RAM) 1003 are connected to one another by a bus 1004.

An input/output interface 1005 is further connected to the bus 1004. An input unit 1006 including a keyboard, a mouse and the like, and an output unit 1007 including a display, a speaker and the like are connected to the input/output interface 1005. Furthermore, a storage unit 1008 including a hard disk, a nonvolatile memory and the like, a communication unit 1009 including a network interface and the like, and a drive 1010 that drives a removable medium 1011 are connected to the input/output interface 1005.

The control of the sensing algorithm as described above is implemented by execution of a predetermined program by the CPU 1001.

Example of Program

The above-described series of processing may be executed by hardware or may be executed by software. In a case where the series of processing is executed by software, a program forming the software is installed on a computer incorporated in dedicated hardware, a general-purpose personal computer or the like.

The program to be installed is recorded in the removable medium 1011 illustrated in FIG. 31 including an optical disk (compact disc-read only memory (CD-ROM), digital versatile disc (DVD) and the like), a semiconductor memory and the like to be provided. Furthermore, this may be provided via a wired or wireless transmission medium such as a local area network, the Internet, and digital broadcasting. The program may be installed in advance on the ROM 1002 and the storage unit 1008.

Note that, the program executed by the computer may be the program of which processing is performed in chronological order in the order described in this specification or may be the program of which processing is performed in parallel or at required timing such as when a call is issued.

Note that, in this specification, the system is intended to mean assembly of a plurality of components (devices, modules (parts) and the like) and it does not matter whether or not all the components are in the same casing. Therefore, a plurality of devices accommodated in different casings and connected via a network and one device in which a plurality of modules is accommodated in one casing are the systems.

The effects described in this specification are illustrative only; the effects are not limited thereto and there may also be another effect.

The embodiments of the present technology are not limited to the above-described embodiments and various modifications may be made without departing from the gist of the present technology.

For example, the present technology may be configured as cloud computing in which one function is shared by a plurality of devices via the network to process together.

Furthermore, each step described in the above-described flowchart may be executed by one device or executed by a plurality of devices in a shared manner.

Moreover, in a case where a plurality of processes is included in one step, the plurality of processes included in one step may be executed by one device or by a plurality of devices in a shared manner.

REFERENCE SIGNS LIST

1 Program management server
2-1 Mobile terminal
2-2 Arm robot
2-3 Moving body
2-4 Cooking robot
2-5 Conveyance robot
21 Sensor device
31 Controller
32 Sensor group
121 Controller
124 Sensor group
201 Situation detection unit
202 Sensing control unit

The invention claimed is:

1. A data processing device comprising:
circuitry configured to
detect a situation of a robot based on sensor data output from a sensor mounted on the robot, wherein the situation of the robot includes a location of the robot,
determine whether to perform an individual identification algorithm or an attribute recognition algorithm based on the situation of the robot, and
select, when it is determined to perform the individual identification algorithm, to execute a first human sensing program which is used to perform the individual identification based on the sensor data output from the sensor mounted on the robot.

2. The data processing device according to claim 1, wherein
the circuitry selects the first human sensing program acquired via a network.

3. The data processing device according to claim 1, wherein
the circuitry selects the first human sensing program to be executed from a human sensing program set including a combination of a plurality of first human sensing programs.

4. The data processing device according to claim 3, wherein
the human sensing program set includes a combination of information indicating a type of human sensing algorithm defined in the first human sensing program and information indicating order of execution of the plurality of first human sensing programs.

5. The data processing device according to claim 3, wherein
the circuitry selects the human sensing program set using identification data to identify the human sensing program set.

6. The data processing device according to claim 3, wherein
human sensing algorithms defined in the plurality of first human sensing programs are algorithms applied to sensor data output while setting different parameters to the same sensor.

7. The data processing device according to claim 3, wherein
human sensing algorithms defined in the plurality of first human sensing programs are algorithms applied to sensor data output while setting a same parameter to the same sensor.

8. The data processing device according to claim 3, wherein
human sensing algorithms defined in the plurality of first human sensing programs are algorithms applied to sensor data output from a plurality of different sensors.

9. The data processing device according to claim 8, wherein
the first human sensing program is associated with the sensor, and
the circuitry controls operations of a plurality of sensors in conjunction with selection and execution of the first human sensing program.

10. The data processing device according to claim 1, wherein
the circuitry is further comprising: a movement control unit configured to control a state of movement by a moving unit accompanying conveyance of a conveyance object on a basis of an execution result of the first human sensing program by the circuitry,
wherein the movement control unit is implemented via at least one processor.

11. The data processing device according to claim 10, wherein
the movement control unit circuitry controls an attitude state including a state of a top plate on which the conveyance object is placed, a state of an extendable support unit that supports the top plate, and a state of movement by the moving unit on a basis of the execution result of the first human sensing program by the circuitry.

12. The data processing device according to claim 11, wherein
the circuitry controls the attitude state including the state of the top plate when the convenance object is place on the top plate by a cooking arm of a cooking system driven according to a cooking process or by a human.

13. A data processing method comprising:
by a data processing device,
detecting a situation of a robot based on sensor data output from a sensor mounted on the robot, wherein the situation of the robot includes a location of the robot;
determining whether to perform an individual identification algorithm or an attribute recognition algorithm based on the situation of the robot; and
selecting, when it is determined to perform the individual identification algorithm, to execute a first human sensing program which is used to perform the individual identification based on the sensor data output from the sensor mounted on the robot.

14. A data processing device comprising:
circuitry configured to
receive, from a robot, a request indicating whether to perform an individual identification algorithm or an attribute recognition algorithm based on a situation of the robot, wherein the situation of the robot includes a location of the robot,
select, when it is determined to perform the individual identification algorithm, a first human sensing program which is used to perform the individual identification based on sensor data output from a sensor mounted on the robot, and
transmit the selected first human sensing program to the robot.

15. The data processing device according to claim 1, wherein
the circuitry is further configured to select, when it is determined not to perform the individual identification, to execute a second human sensing program which is used to recognize one or more attributes of a human based on the sensor data output from the sensor mounted on the robot.

16. The data processing device according to claim 1, wherein
the first human sensing program is used to identify individual customer information associated with respective order information, the individual customer information including at least one of
a number of times that each identified individual places an order, or
order content determined according to an order history of each identified individual.

17. The data processing device according to claim 15, wherein
the second human sensing program is used to estimate at least one of an age or a sex of a sensed human.

18. The data processing device according to claim 1, wherein
the situation of the robot further includes information about at least one of weather, temperature, humidity, or brightness in the location where the robot is located.

19. The data processing device according to claim 1, wherein
the situation of the robot further includes at least one of a situation of a person with whom the robot is communicating or a situation of an obstacle around the robot.

20. The data processing device according to claim 10, wherein
the state of movement includes at least one of a destination information, a priority destination information, or a direction of the robot.

* * * * *